United States Patent
Deboy et al.

(10) Patent No.: US 11,342,853 B2
(45) Date of Patent: May 24, 2022

(54) POWER CONVERTER CIRCUIT WITH A MAIN CONVERTER AND AN AUXILIARY CONVERTER

(71) Applicant: Infineon Technologies Austria AG, Villach (AT)

(72) Inventors: Gerald Deboy, Klagenfurt (AT); Johann Kolar, Zurich (CH); Dominik Neumayr, Zurich (CH)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 17/117,328

(22) Filed: Dec. 10, 2020

(65) Prior Publication Data

US 2021/0091674 A1   Mar. 25, 2021

Related U.S. Application Data

(62) Division of application No. 15/927,330, filed on Mar. 21, 2018.

(30) Foreign Application Priority Data

Mar. 24, 2017  (DE) .......................... 102017106424.9

(51) Int. Cl.
*H02M 3/335* (2006.01)
*H02M 1/08* (2006.01)
(Continued)

(52) U.S. Cl.
CPC ....... *H02M 3/33569* (2013.01); *H02M 1/083* (2013.01); *H02M 3/337* (2013.01);
(Continued)

(58) Field of Classification Search
CPC ............. H02M 3/335; H02M 3/33507; H02M 3/33515; H02M 3/33523; H02M 3/3353;
(Continued)

(56) References Cited

U.S. PATENT DOCUMENTS

| | | | |
|---|---|---|---|
| 4,680,688 A * | 7/1987 | Inou ................. | H02M 3/33546 363/131 |
| 5,117,157 A | 5/1992 | Vos | |
| 5,119,283 A | 6/1992 | Steigerwald et al. | |
| 5,481,449 A | 1/1996 | Kheraluwala et al. | |
| 6,018,467 A * | 1/2000 | Majid ............... | H02M 3/33569 363/16 |

(Continued)

FOREIGN PATENT DOCUMENTS

| | | |
|---|---|---|
| GB | 2115627 A | 9/1983 |
| GB | 2152771 A | 8/1985 |

OTHER PUBLICATIONS

Office action, application No. 10 2017 106 424.9, dated Nov. 7, 2017, pp. 6.

*Primary Examiner* — Thienvu V Tran
*Assistant Examiner* — Ivan Laboy
(74) *Attorney, Agent, or Firm* — Armis IP Law, LLC

(57) ABSTRACT

A power converter circuit includes an input configured to receive an input voltage and an output configured to provide an output voltage; a main converter coupled between a main converter input and the output and comprising a first winding and a second winding that are inductively coupled; and an auxiliary converter comprising an auxiliary converter input coupled to a third winding and an auxiliary converter output, wherein the third winding is inductively coupled with the first winding and the second winding. The auxiliary converter output is coupled between the input and the main converter input.

11 Claims, 20 Drawing Sheets

(51) Int. Cl.
*H02M 3/337* (2006.01)
*H02M 1/00* (2006.01)

(52) U.S. Cl.
CPC ........ *H02M 1/0058* (2021.05); *H02M 1/0093* (2021.05); *H02M 3/33523* (2013.01); *Y02B 70/10* (2013.01)

(58) Field of Classification Search
CPC ......... H02M 3/33538; H02M 3/33546; H02M 3/33553; H02M 3/33569; H02M 3/33576; H02M 3/33584; H02M 3/33592; H02M 3/337; H02M 3/3376; H02M 2001/0054; H02M 2001/0058; H02M 2001/0083; H02M 2001/0093; H02M 1/083; H02M 2007/4811; H02M 2007/4815; H02M 2007/4818; H02M 2007/4826; H02M 7/523
See application file for complete search history.

(56) References Cited

U.S. PATENT DOCUMENTS

| | | |
|---|---|---|
| 2005/0281059 A1 | 12/2005 | Yasumura |
| 2006/0279967 A1* | 12/2006 | Shao ................. H02M 3/33592 363/21.01 |
| 2009/0010031 A1 | 1/2009 | Kuan |
| 2012/0313433 A1* | 12/2012 | Uno .................. H02M 3/33561 307/31 |
| 2014/0146577 A1* | 5/2014 | Uno .................. H02M 3/33561 363/21.02 |
| 2015/0109828 A1 | 4/2015 | Koo et al. |
| 2015/0162841 A1* | 6/2015 | Masuda .............. H02M 3/3376 363/17 |
| 2017/0063251 A1 | 3/2017 | Ye et al. |
| 2017/0251535 A1* | 8/2017 | Huang ............... H05B 45/3725 |
| 2017/0288557 A1 | 10/2017 | Fang et al. |
| 2017/0338680 A1* | 11/2017 | Baier ...................... H02M 1/44 |
| 2020/0136517 A1* | 4/2020 | Dai ..................... H02M 3/3372 |

\* cited by examiner

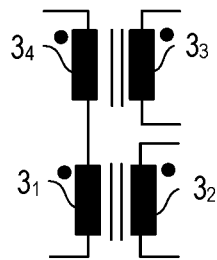
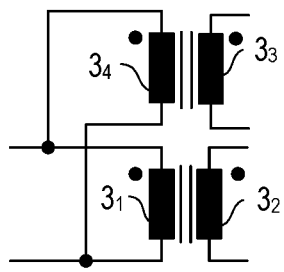
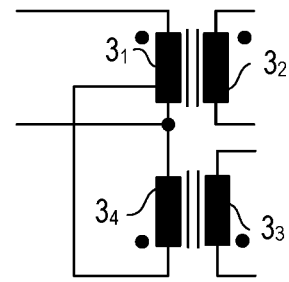
FIG 31A    FIG 31B    FIG 31C
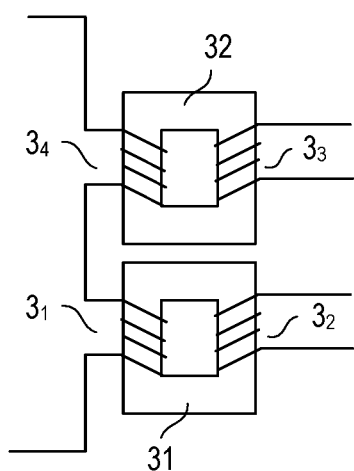
FIG 32
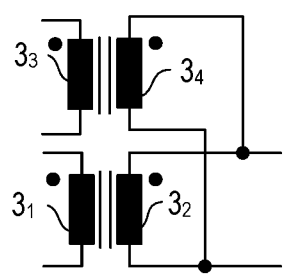    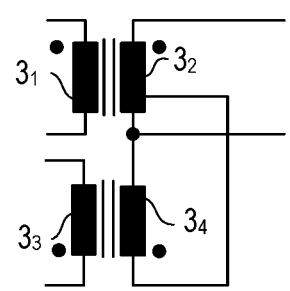
FIG 33A    FIG 33B

POWER CONVERTER CIRCUIT WITH A MAIN CONVERTER AND AN AUXILIARY CONVERTER

RELATED APPLICATIONS

This application is a divisional application of earlier filed U.S. patent application Ser. No. 15/927,330 entitled "POWER CONVERTER CIRCUIT WITH A MAIN CONVERTER AND AN AUXILIARY CONVERTER,", filed on Mar. 21, 2018, the entire teachings of which are incorporated herein by this reference.

U.S. patent application Ser. No. 15/927,330 is related to and claims priority to earlier filed German Patent Application Serial Number 102017106424.9 entitled "POWER CONVERTER CIRCUIT WITH A MAIN CONVERTER AND AN AUXILIARY CONVERTER,", filed on Mar. 24, 2017, the entire teachings of which are incorporated herein by this reference.

BACKGROUND

DC-DC power converter circuits are widely used in server or telecommunication applications, for example, for converting a DC (direct current) input voltage, such as a 380V DC voltage, into a DC output voltage, such as a 48V DC voltage. A DC-DC power converter circuit may include a resonant converter, such as an LLC converter.

A resonant converter is known to have a high efficiency, low electromagnetic interference (EMI), and a high power density, in particular when operated at its resonance frequency. Moreover, when operated at its resonance frequency, a ratio between an input voltage and an output voltage of the series resonant converter is independent of a current level of an output current of the series resonant converter, wherein this ratio is dependent on a winding ratio of a transformer in the resonant converter. In other words, at this operation point, the resonant converter is self-regulated and automatically adjusts the output current such that the output voltage is proportional to the input voltage.

BRIEF DESCRIPTION OF EMBODIMENTS

This disclosure includes the observation that variations of the input voltage, however, may make it necessary to operate the series resonant converter at frequencies different from the resonant frequency in order to regulate the output voltage such that it is essentially constant. This, however, reduces the efficiency of the series resonant converter and may increase the complexity of an EMI (electromagnetic interference) filter implemented in the converter.

It is therefore desirable to provide a DC-DC power converter circuit in which a resonant converter can be operated at an optimum operation point over a wide input voltage and output current range.

One example of a power converter circuit includes an input configured to receive an input voltage and an output configured to provide an output voltage, a main converter coupled between a main converter input and the output and comprising a first winding and a second winding that are inductively coupled, and an auxiliary converter comprising an auxiliary converter input coupled to a third winding and an auxiliary converter output. The third winding is inductively coupled with the first winding and the second winding, and the auxiliary converter output is coupled between the input and the main converter input.

Another example of a power converter circuit includes an input configured to receive an input voltage and an output configured to provide an output voltage, a main converter coupled between a main converter input and the output and comprising a first winding and a second winding that are inductively coupled, and an auxiliary converter comprising an auxiliary converter input coupled to a third winding and an auxiliary converter output. The third winding is inductively coupled with the first winding and the second winding, and the auxiliary converter output is coupled between the main converter output and the output.

One example of a power conversion method includes receiving an input voltage by an input of a power converter circuit and providing an output voltage by an output of the power converter circuit, receiving a main converter input voltage by a main converter input and providing a main converter output voltage by the main converter, wherein the main converter comprises a first winding and a second winding that are inductively coupled, generating an auxiliary voltage by an auxiliary converter, wherein the auxiliary converter comprises an auxiliary converter input coupled to a third winding, wherein the third winding is inductively coupled with the first winding and the second winding, and generating the main converter input voltage based on the input voltage and the auxiliary voltage.

Another example of a power conversion method includes receiving an input voltage by an input of a power converter circuit and providing an output voltage by an output of the power converter circuit, receiving a main converter input voltage by a main converter input and providing a main converter output voltage by the main converter, wherein the main converter comprises a first winding and a second winding that are inductively coupled, generating an auxiliary voltage by an auxiliary converter, wherein the auxiliary converter comprises an auxiliary converter input coupled to a third winding, wherein the third winding is inductively coupled with the first winding and the second winding, and generating the output voltage based on the main converter output voltage and the auxiliary voltage.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

FIGS. 31A to 31C are example diagrams illustrating different examples of how a first winding, a second winding and a third winding of the power converter circuit can be implemented according to embodiments herein;

FIG. 32 is an example diagram illustrating a first transformer including the first winding and the second winding and a second transformer including the third winding according to embodiments herein; and FIGS. 33A and 33B are example diagrams illustrating how a first winding, a second winding and a third winding of the power converter circuit can be implemented according to embodiments herein.

DETAILED DESCRIPTION

In the following detailed description, reference is made to the accompanying drawings. The drawings form a part of the description and for the purpose of illustration show examples of how the embodiments herein may be used and implemented. It is to be understood that the features of the various embodiments described herein may be combined with each other, unless specifically noted otherwise.

Figure 1:
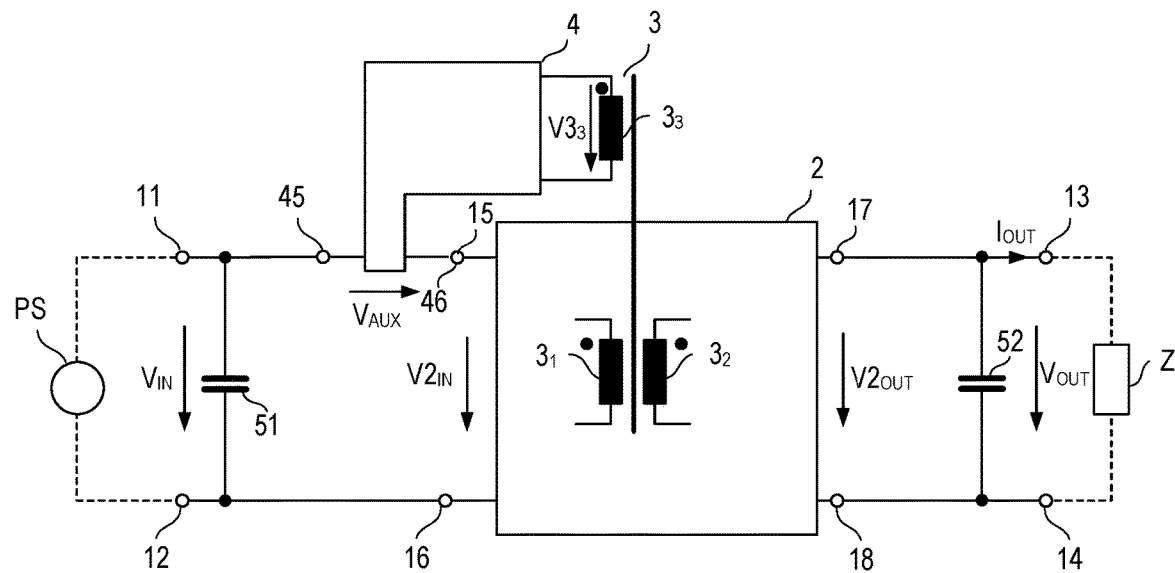
FIG. 1 is an example diagram illustrating a power converter circuit with a main converter and an auxiliary converter according to embodiments herein.
Figure 2:
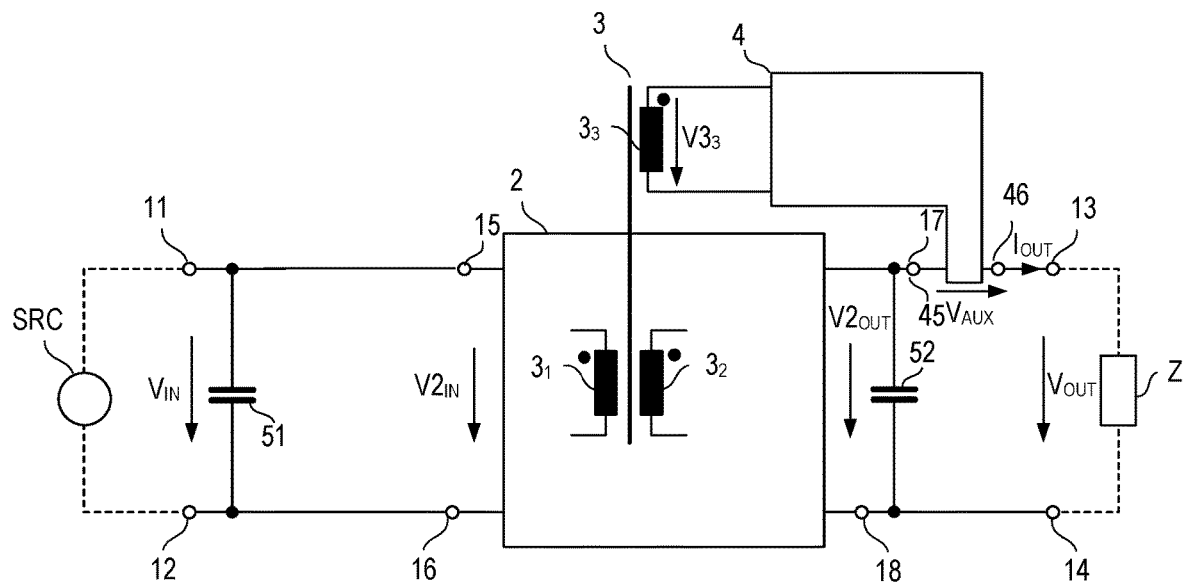
FIG. 2 is an example diagram illustrating a power converter circuit with a main converter and an auxiliary converter according to embodiments herein.

FIG. 1 shows one example and FIG. 2 shows another example of a power converter circuit, in particular a DC-DC power converter circuit. Referring to FIGS. 1 and 2, the power converter circuit includes an input with a first input node 11 and a second input node 12, and an output with a first output node 13 and a second output node 14. The input 11, 12 is configured to receive an input voltage $V_{IN}$ from a DC (Direct Current) power source PS, and the output 13, 14 is configured to provide an output voltage $V_{OUT}$ to a load Z. The power source PS and the load Z are not part of the power converter circuit and are drawn in dashed lines in FIG. 1. The power source PS may be any type of DC power source, and the load Z may be any type of load operating at a DC voltage. Examples of the power source PS include, but are not restricted to, a battery, or another power converter such as an AC-DC converter configured to generate the input voltage $V_{IN}$ from a power grid voltage. Examples of the load Z include, but are not restricted to, motherboards of computer servers or bus converters for telecom applications. The power converter circuit is configured to regulate the output voltage $V_{OUT}$ such that it is essentially constant. The output voltage $V_{OUT}$ is, for example, selected from a range of between 10V and 100V, in particular between 20V and 60V. According to one example, the output voltage $V_{OUT}$ is 48V. The input voltage $V_{IN}$ is, for example, selected from a range of between 300V and 600V, in particular between 360V and 550V. According to one example, a rated voltage level of the input voltage $V_{IN}$ is 380 V. The input voltage $V_{IN}$, however, may deviate from the rated level, which is explained herein further below.

Optionally, a first capacitor 51, which is referred to as input capacitor in the following, is connected between the first input node 11 and the second input node 12 of the power converter circuit. Optionally, a second capacitor 52, which is referred to as output capacitor in the following, is connected between the first output node 17 and the second output node 18 of the main converter circuit 2.

Referring to FIGS. 1 and 2, the power converter circuit further includes a main converter 2 with a main converter input 15, 16 and a main converter output 17, 18. The main converter 2 includes a first winding $3_1$ and a second winding $3_2$ of a transformer 3, wherein the transformer 3 provides for a galvanic isolation between the main converter input 15, 16 and the main converter output 17, 18. Further, the power converter circuit further includes an auxiliary converter 4 and a third winding $3_3$. The third winding $3_1$-$3_3$ is inductively coupled with at least one of the first winding $3_1$ and the second winding $3_2$. Further, these windings $3_1$, $3_2$, and $3_3$ have the same winding sense. The first winding $3_1$, the second winding $3_2$, and the third winding $3_3$ may be part of one transformer. In this case, the third winding $3_3$ is inductively coupled with each of the first winding $3_1$ and the second winding $3_2$. This is schematically illustrated in FIGS. 1 and 2. According to another example, the first winding $3_1$ and the second winding $3_2$ are part of a first transformer and the third winding $3_3$ is part of a second transformer The second transformer includes another winding inductively coupled with the third winding and electrically coupled with one of the first winding and the second winding. In this example, the third winding $3_3$ is indirectly coupled with one of the first winding $3_1$ and the second winding $3_2$. Examples of this are explained with reference to FIGS. 31A to 31C, 32, and 33A to 33B herein further below.

Referring to FIGS. 1 and 2, an input of the auxiliary converter 4 is connected to the third winding $3_3$ of the transformer. The auxiliary converter 4 is configured to generate an auxiliary voltage $V_{AUX}$ based on a voltage $V3_3$ across the third winding $3_3$. Examples of how the auxiliary converter 4 may generate the auxiliary voltage $V_{AUX}$ based on the voltage $V3_3$ across the third winding $3_3$ are explained in detail herein further below.

The examples shown in FIG. 1 and FIG. 2 are different with regard to how the auxiliary converter 4 is arranged in the power converter circuit. In the example shown in FIG. 1, an output 45, 46 of the auxiliary converter 4 is connected between the input 11, 12 of the power converter circuit and the main converter input 15, 16. The auxiliary voltage $V_{AUX}$ is available at the output 45, 46 of the auxiliary converter 4, so that in the example shown in FIG. 1, a main converter input voltage $V2_{IN}$, which is the voltage at the main converter input 15, 16, is dependent on the input voltage $V_{IN}$ and the auxiliary voltage $V_{AUX}$. More specifically, in the example shown in FIG. 1, the main converter input voltage $V_{IN}$ is given by the input voltage $V_{IN}$ minus the auxiliary voltage $V_{AUX}$, that is, $$V2_{IN}=V_{IN}-V_{AUX} \tag{1a}$$

In this example, the output voltage $V_{OUT}$ of the power converter circuit equals a main converter output voltage $V2_{OUT}$, which is the voltage at the main converter output 17, 18.

In the example shown in FIG. 2, the output 45, 46 of the auxiliary converter 4 is connected between the main converter output 17, 18 and the output 13, 14 of the power converter circuit. In this example, the output voltage $V_{OUT}$ is dependent on the main converter output voltage $V2_{OUT}$ and the auxiliary voltage $V_{AUX}$. More specifically, in the example shown in FIG. 2, the output voltage $V_{OUT}$ is given by the main converter output voltage $V2_{OUT}$ minus the auxiliary voltage $V_{AUX}$, that is, $$V_{OUT}=V2_{OUT}-V_{AUX} \tag{1b}$$

In this example, the main converter input voltage $V2_{IN}$ equals the input voltage $V_{IN}$ of the power converter circuit. In both the example shown in FIG. 1 and the example shown in FIG. 2 the auxiliary voltage may be a continuous (steady) voltage with a variable voltage level or a PWM voltage with an alternating voltage level. This is explained in further detail herein further below.

According to one example, the main converter 2 is configured to generate the main converter output voltage $V2_{OUT}$ such that it is proportional to the main converter input voltage $V2_{IN}$ independent of a power consumption of the load Z, that is, independent of an output current $I_{OUT}$ received by the load Z from the power converter circuit. Given the proportionality between the main converter output voltage $V2_{OUT}$ and the main converter input voltage $V2_{IN}$, variations of the main converter input voltage $V2_{IN}$ may result in variations of the main converter output voltage $V2_{OUT}$. Variations of the main converter input voltage $V2_{IN}$ may result from variations of the input voltage $V_{IN}$. The auxiliary converter 4 helps to regulate the output voltage $V_{OUT}$ to be substantially constant. In the example shown in FIG. 1, the auxiliary converter 4 regulates the main converter output voltage $V2_{OUT}$ (which equals the output voltage $V_{OUT}$ of the power converter circuit in this example) by regulating the main converter input voltage $V2_{IN}$. Regulating the main converter input voltage $V2_{IN}$ includes superimposing the auxiliary voltage $V_{AUX}$ on the input voltage $V_{IN}$. In the example shown in FIG. 2, the auxiliary converter 4 regulates the output voltage $V_{OUT}$ by superimposing the auxiliary voltage $V_{AUX}$ on the main converter output voltage $V2_{OUT}$. In this example, the main converter output voltage $V2_{OUT}$ may vary due to variations of the input voltage $V_{IN}$, which equals the main converter input voltage $V2_{IN}$ in this example.

One example of a main converter 2 that is configured to generate the main converter output voltage $V2_{OUT}$ proportional to the main converter input voltage $V2_{IN}$ is a resonant converter, in particular, a resonant converter operated at its resonance frequency. An example of a resonant converter is explained in the following.

Figure 3:
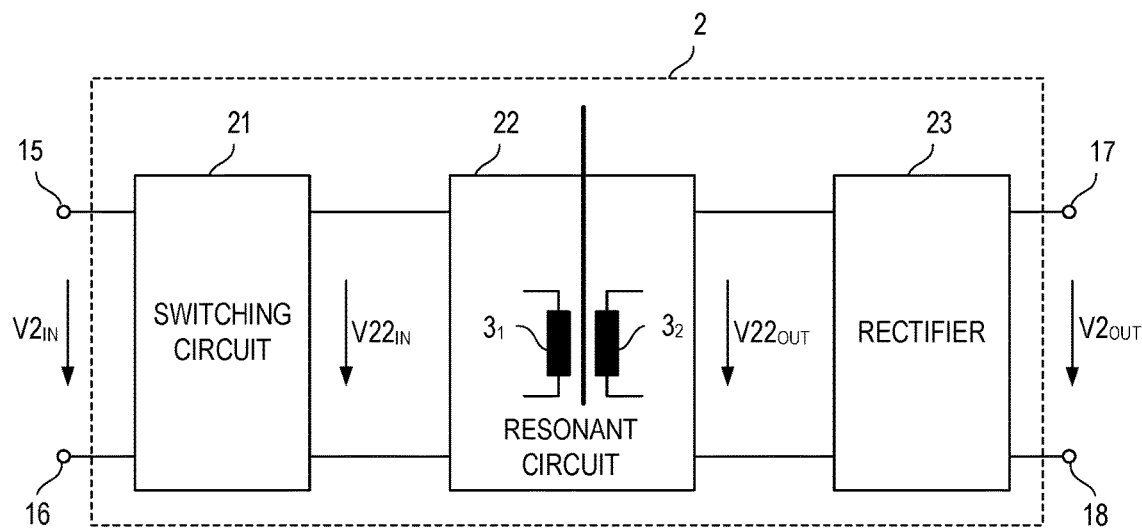
FIG. 3 is an example diagram illustrating an example of a main converter that includes a switching circuit, a resonant converter, and a rectifier according to embodiments herein.
Figure 4:
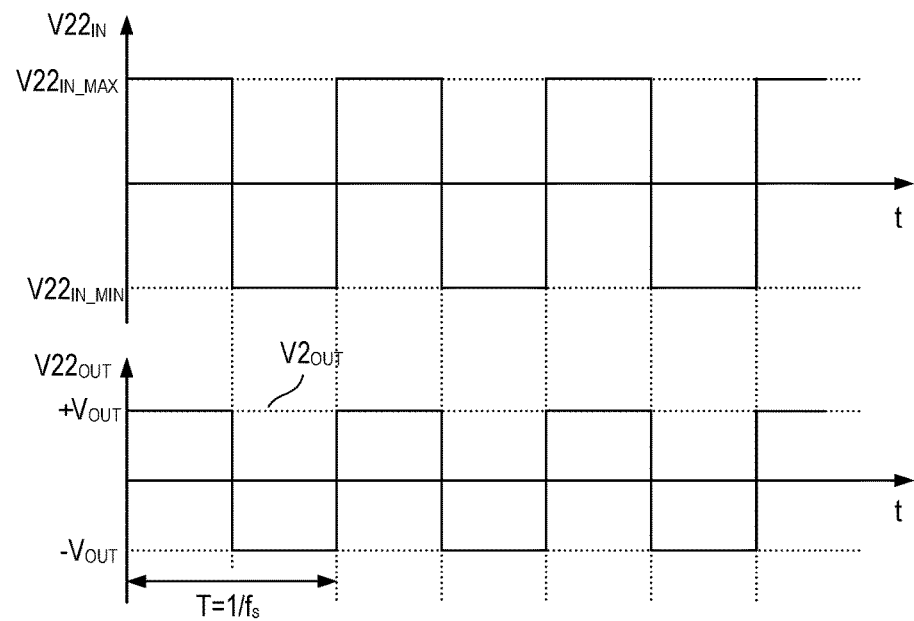
FIG. 4 is an example timing diagrams that illustrates waveforms of voltages occurring in the main converter shown in FIG. 3 according to embodiments herein.

FIG. 3 shows one example of the main converter 2 implemented as a resonant converter. In this example, the main converter 2 includes a switching circuit 21 that receives the main converter input voltage $V2_{IN}$, a resonant circuit 22 connected downstream the switching circuit 21, and a rectifier 23 connected downstream the resonant circuit 22. The main converter output voltage $V2_{OUT}$ is available at an output of the rectifier 23. The first winding $3_1$ and the second winding $3_2$ of the transformer 3 are included in the resonant circuit 22. The switching circuit 21 is configured to generate an alternating voltage $V22_{IN}$ from the main converter input voltage $V_{IN}$. This is illustrated in FIG. 4, which shows example timing diagrams of the alternating voltage $V22_{IN}$ provided by the switching circuit 22, and an output voltage $V22_{OUT}$ of the resonant circuit 22. Just for the purpose of illustration, the timing diagrams shown in FIG. 4 are based on the assumption that the main converter input voltage $V2_{IN}$ is a direct voltage. In this example, the alternating voltage $V22_{IN}$ is an alternating rectangular voltage that includes a plurality of successive periods, with each period including a positive half period and a negative half period. In the positive half period, a voltage level of the alternating voltage $V22_{IN}$ equals a maximum level $V22_{IN\_MAX}$, and in the negative half period, the voltage level equals a minimum level. In FIG. 4, T denotes the duration of one period of the alternating voltage $V22_{IN}$. The reciprocal $f_S=1/T$ of this duration is referred to as frequency of the alternating voltage $V22_{IN}$ in the following. The minimum level $V22_{IN\_MIN}$ and the maximum level $V22_{IN\_MAX}$ of the alternating voltage $V22_{IN}$ are dependent on the specific type of switching circuit 21. According to one example, the switching circuit 21 is implemented such that the maximum level $V22_{IN\_MAX}$ equals the voltage level of the input voltage $V2_{IN}$ and the minimum level $V22_{IN\_MIN}$ equals -1 times the voltage level of the input voltage $V2_{IN}$. According to another example, the switching circuit 21 is implemented such that the maximum level $V22_{IN\_MAX}$ equals the voltage level of the input voltage $V2_{IN}$ and the minimum level $V22_{IN\_MIN}$ is zero.

According to one example, the resonant circuit is configured to generate an alternating output voltage $V22_{OUT}$ from the alternating voltage $V22_{IN}$ generated by the switching circuit 21. This output voltage $V22_{OUT}$ may be in phase with the alternating voltage $V22_{IN}$, or there may be a phase difference between these alternating voltages. FIG. 4 shows a signal waveform of one example of the output voltage $V22_{OUT}$ that is in phase with the alternating voltage $V22_{IN}$. A voltage level of this alternating output voltage $V22_{OUT}$ may alternate between $+V2_{OUT}$ and $-V2_{OUT}$. The rectifier 23 is configured to generate the main converter output voltage $V2_{OUT}$ based on this alternating voltage $V22_{OUT}$.

The resonant circuit 22 shown in FIG. 3 has a resonance frequency. According to one example, the frequency $f_S$ of the alternating voltage $V22_{IN}$ is selected such that it substantially equals the resonance frequency. In this case, the resonant converter 22 generates the main converter output voltage $V2_{OUT}$ such that it is proportional to the main converter input voltage $V2_{IN}$, widely independent of a power consumption of the load Z. "To be substantially equal the resonance frequency" means that the frequency $f_S$ deviates less than 10%, less than 5%, less than 3%, or even less than 1% from the resonance frequency of the resonant circuit.

Figure 5A:
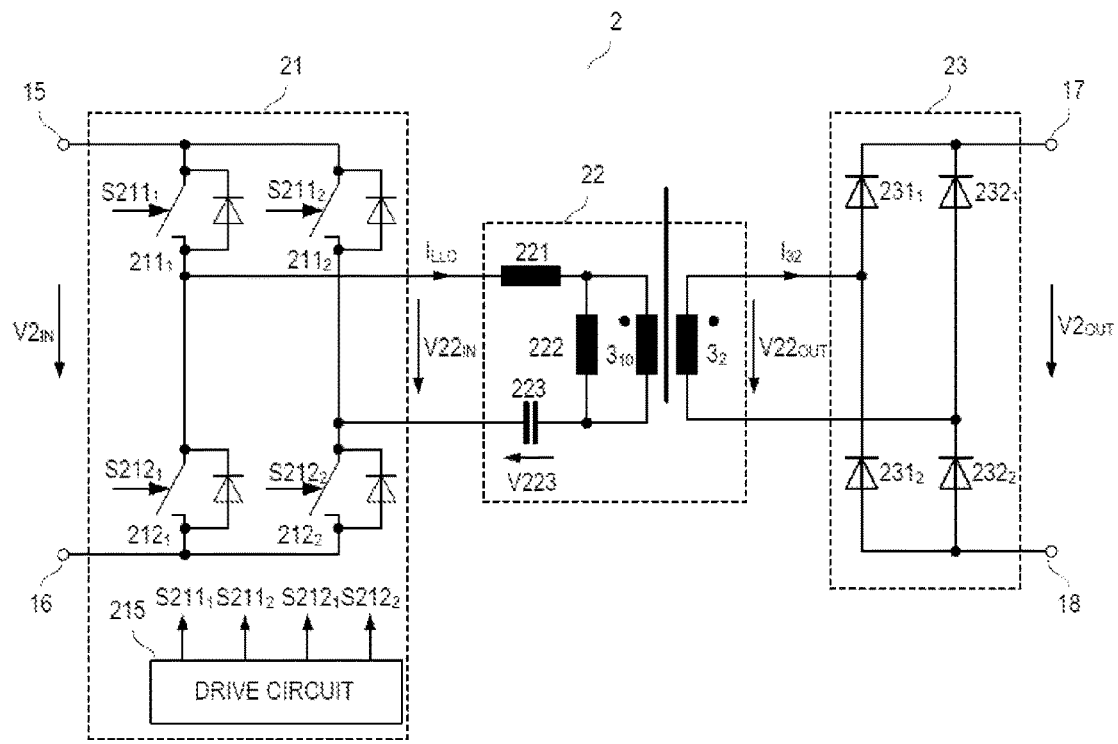
FIGS. 5A, 5B, 5C, and 5D are example diagrams illustrating examples of the switching circuit, the resonant converter and the rectifier in greater detail according to embodiments herein.

FIG. 5A shows one example of a main converter 2 implemented as a resonant converter in greater detail. In this example, the switching circuit 21 includes a bridge circuit with a first half bridge and a second half-bridge each including a high side switch $211_1$, $212_1$ and a low side switch $211_2$, $212_2$. The high side switch $211_1$, $212_1$ and the low side switch $211_2$, $212_2$ of each half bridge are connected in series between the input nodes 15, 16 of the main converter input. A circuit node common to the high side switch $211_1$, $212_1$ and the low side switch $211_2$, $212_2$ of each half bridge forms an output of the respective half bridge. An output of the switching circuit 21 is formed by the output nodes of the two half bridges. An input of the resonant circuit 22 is connected to the output of the switching circuit 21, where the alternating voltage $V22_{IN}$ is available. In the example shown in FIG. 5A, the resonant circuit 22 is includes a first inductor 221, a second inductor 222, a transformer winding $3_{10}$ inductively coupled with the secondary winding $3_2$ and a capacitor 223. The primary winding $3_1$ of the transformer 3 mentioned before can be drawn to includes a stray inductance, a magnetization inductance and an ideal winding coupled with the secondary winding $3_2$. According to one example, the stray inductance of the primary winding $3_1$ is part of the first inductance 221, the magnetization inductance is part of the second inductance 222 and transformer winding $3_{10}$ represents the ideal winding. The first inductor 221 may only be comprised of the magnetization inductance or may additionally include a discrete inductor, and the second inductor 222 may only be comprised of the stray inductance or may additionally include a discrete inductor. The secondary winding $3_2$ also includes a stray inductance, and a magnetization inductance. These, however, are not explicitly drawn in FIG. 5A.

The resonant circuit shown in FIG. 5A is a series resonant circuit in which the first inductor 221, a parallel circuit with the second inductor 222 and the winding $3_{10}$, and the capacitor 223 are connected in series. This series circuit is connected between the output of the first half bridge $211_1$, $211_2$ and the output of the second half bridge $212_1$, $212_2$. The second winding $3_2$ of the transformer, which is inductively coupled with the first winding $3_1$, is connected between output nodes of the resonant circuit 22, wherein an output voltage $V22_{OUT}$ of the resonant circuit 22 is available across the second winding $3_2$. The type of resonant circuit 22 shown in FIG. 5 may also be referred to as LLC series resonant circuit, or LLC tank. In the example shown in FIG. 5, the parallel circuit with the second inductor 222 and the winding $3_{10}$ is connected between the first inductor 221 and the capacitor 223. This, however, is only an example. According to another example, not shown, the first inductor 221 and the capacitor 223 are directly connected so that, for example, the capacitor 223 is connected between the switching circuit 21 and the first inductor 221. In this example, the resonance frequency $f_S$ is given by $$f_S = \frac{1}{2\pi\sqrt{L221 \cdot C223}}, \quad (2)$$

wherein L221 is the inductance of the first inductor 221 and C223 is the capacitance of the capacitor 223.

Figure 5B:
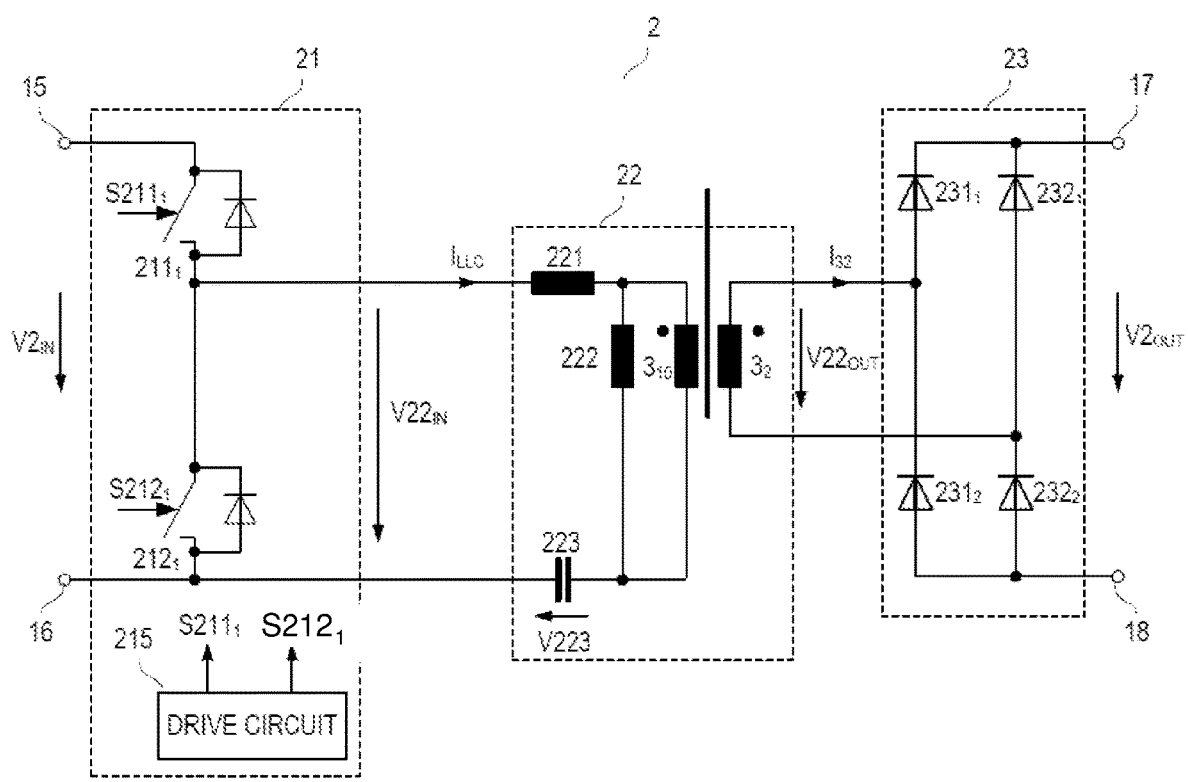
Figure 5C:
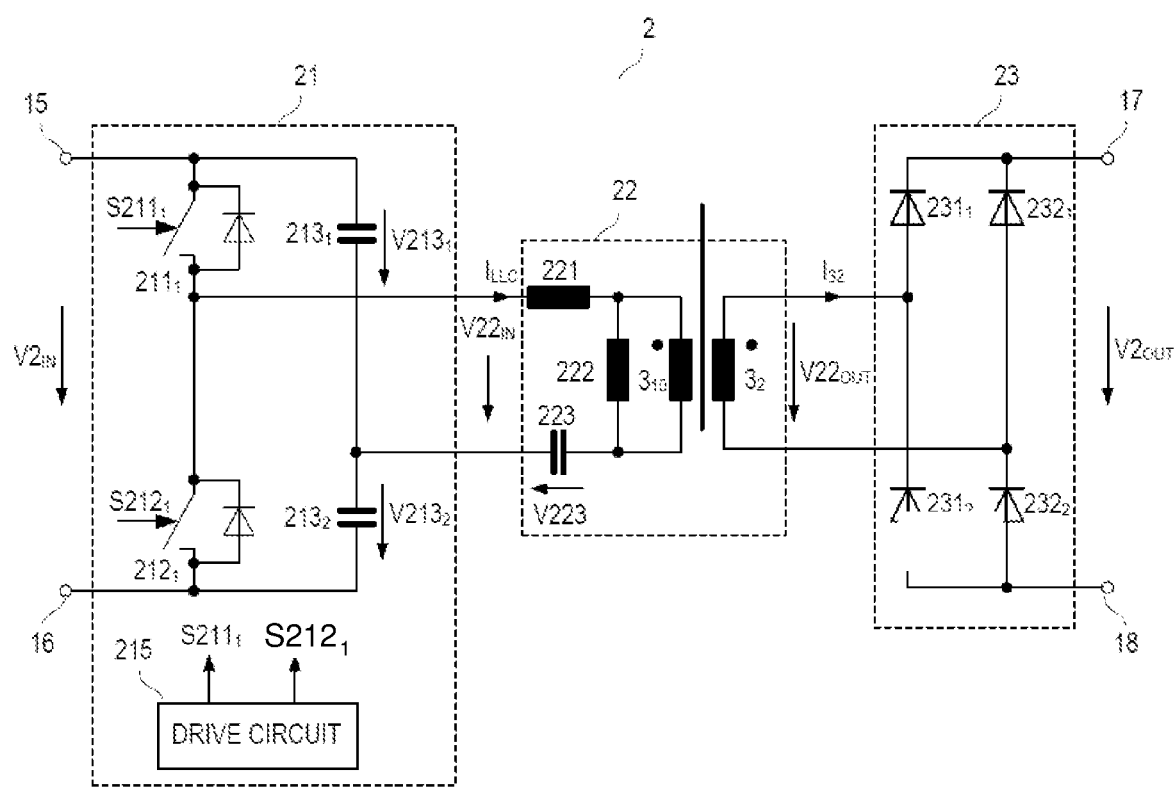
Figure 5D:
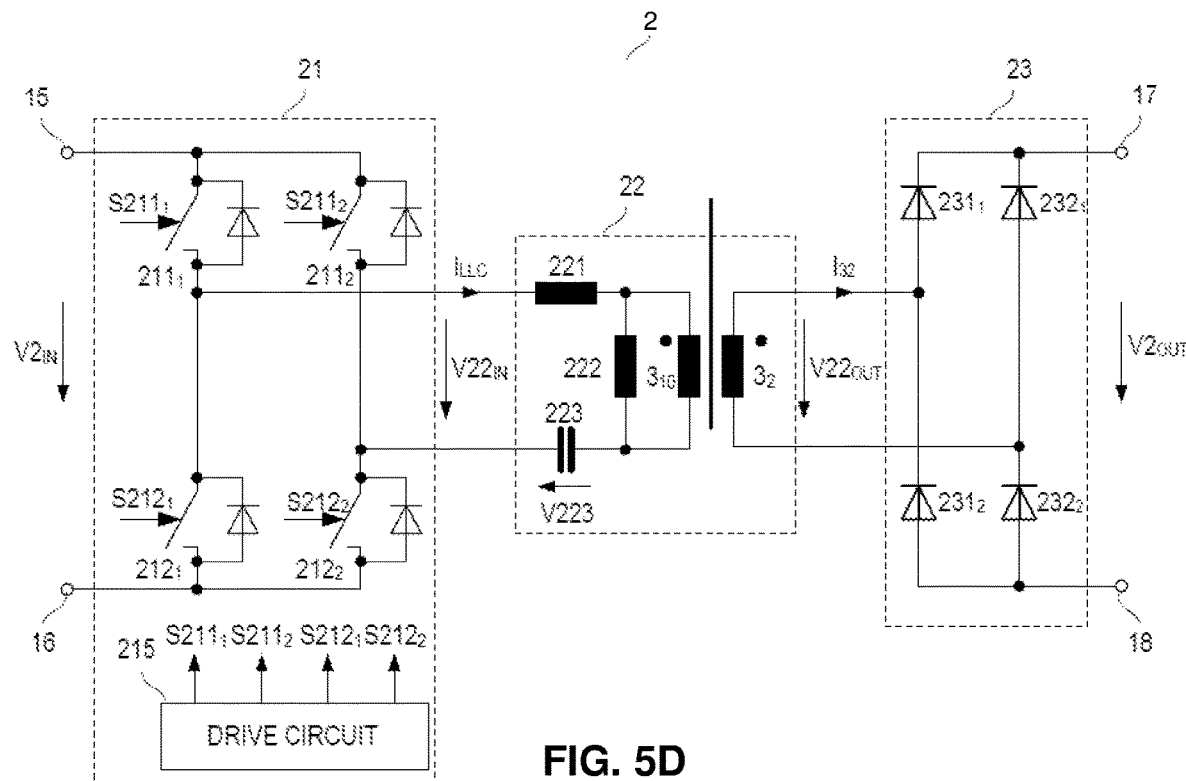

In the example shown in FIG. 5D, each of the high side switch $211_1$, $212_1$ and the low side switch $211_2$, $212_2$ of the first and second half bridge includes a switching element and a rectifier element connected in parallel with the switching element. Just for the purpose of illustration, the rectifier element is drawn as a bipolar diode in the example shown in FIG. 5D. However, any other type of passive rectifier element, such as a Schottky diode may be used as well. Those switches including a switching element and a parallel rectifier element may be implemented in various ways. Some examples are explained with reference to FIG. 6A to 6C below.

Figure 6A:
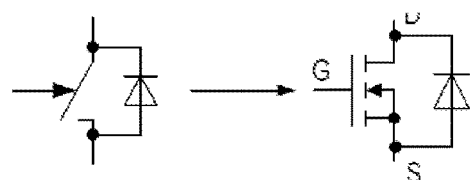
FIGS. 6A to 6C illustrate different example diagrams of how a switching element and a parallel rectifier element as used in the switching circuit shown in FIGS. 5A, 5B, 5C, and 5D may be implemented according to embodiments herein.

Referring to FIG. 6A, a switch with a switching element and a rectifier element can be implemented as a MOSFET (Metal Oxide Semiconductor Field-Effect Transistor). In this case, the rectifier element can be formed by an integrated diode, which is often referred to as body diode, or by an additional rectifier element connected in parallel with a drain-source path D-S of the MOSFET. Just for the purpose of illustration, the MOSFET is drawn as an n-type MOSFET in the example shown in FIG. 6A. However, a p-type MOSFET may be used as well. According to another example shown in FIG. 6B, a switch with a switching element and a rectifier element may be implemented using an IGBT and a rectifier element connected in parallel with a collector-emitter-path C-E of the IGBT. According to yet another example shown in FIG. 6C, a switch with a switching element and a rectifier element may be implemented using a HEMT (High Electron-Mobility Transistor), such as a gallium nitride-(GaN)-HEMT. Any switch with a switching element and a parallel rectifier element shown in any of the drawings may be implemented in accordance with any of the examples shown in FIGS. 6A to 6C. In each case, the parallel rectifier element may be an inherent rectifier element such as the body diode in a MOSFET or a similar diode in a HEMT and/or an additional rectifier element.

Figure 6B:
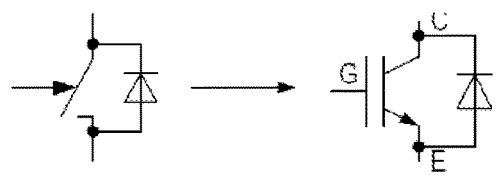
Figure 6C:
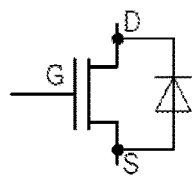

Referring to FIG. 5A, the switching circuit 21 further includes a drive circuit 215 configured to drive the high side switch $211_1$, $212_1$ and the low side switch $211_2$, $212_2$ of the first and second half bridge. Each of the high side and low side switches $211_1$-$212_2$ receives a respective drive signal $S211_1$, $S211_2$, $S212_1$, $S212_2$ at a respective control node from the drive circuit 215. In case of a MOSFET, as shown in FIG. 6A, the control node is a gate node G. The control node of an IGBT, as shown in FIG. 6B, is a gate node G, and the control node of a HEMT, as shown in FIG. 6C, is a gate node G.

Figure 7:
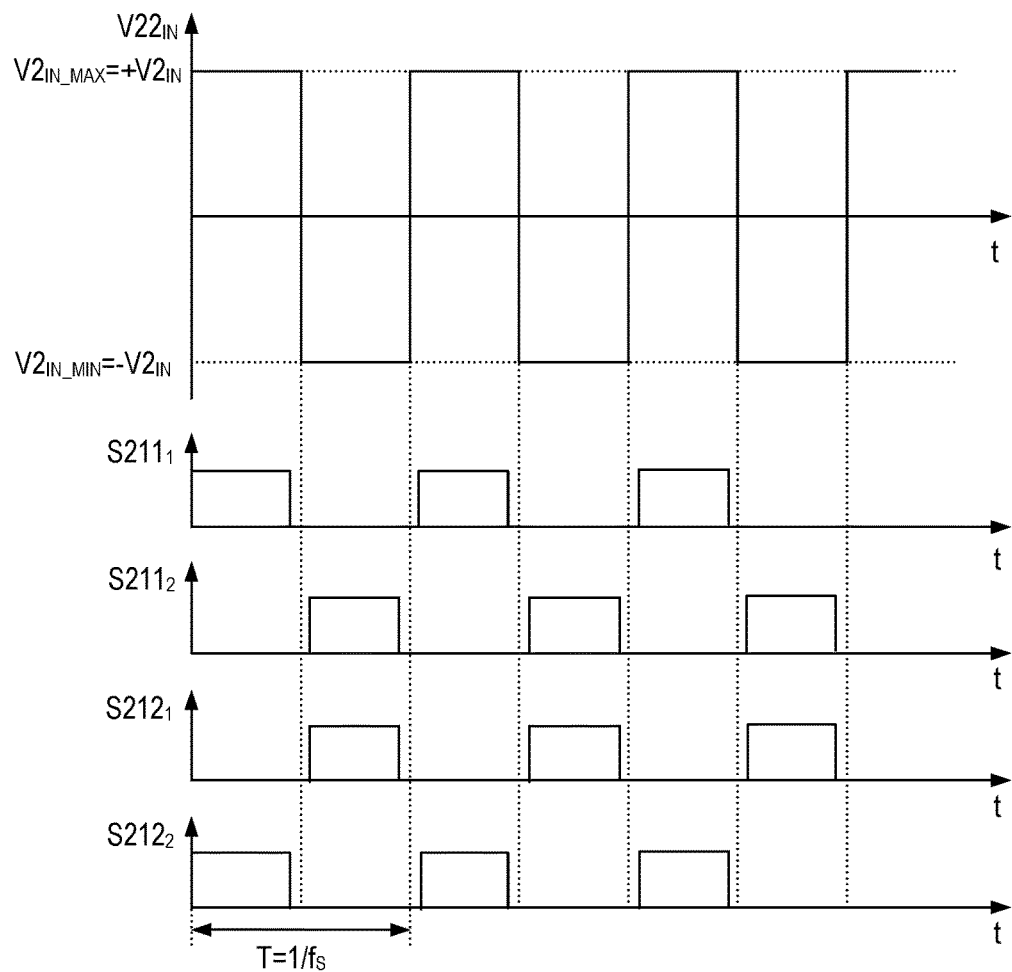
FIG. 7 is an example diagram illustrating timing diagrams of one way of operation of the switching circuit shown in FIGS. 5A, 5B, 5C, and 5D according to embodiments herein.

One way of operation of the switching circuit 21 shown in FIG. 5A is explained with reference to FIG. 7 below. FIG. 7 shows example timing diagrams of the alternating voltage $V22_{IN}$ generated by the switching circuit 21 based on the main converter input voltage $V2_{IN}$ and of the drive signals $S211_1$-$S212_2$ generated by the drive circuit 215. In the type of switching circuit 21 shown in FIG. 5A, the switching circuit output voltage $V22_{IN}$ alternates between $V_{IN\_MIN}=-V2_{IN}$ and $V_{IN\_MAX}=+V2_{IN}$. Just for the purpose of illustration, the signal waveform of the alternating voltage $V22_{IN}$ shown in FIG. 7 is based on the assumption that the main converter input voltage $V2_{IN}$ is a constant DC voltage. Further, just for the purpose of illustration, the signal waveform of the switching circuit output voltage $V22_{IN}$ is drawn as a rectangular waveform. In reality, however, edges of the switching circuit output voltage $V22_{IN}$ may rise and fall slower than illustrated. These edges may rise and fall linearly or not linearly over time. The rise and fall of these edges is, inter alia, dependent on the specific type of switches used to implement the switching circuit 21.

Referring to FIG. 7, each of the drive signals $S211_1$-$S212_2$ can have an on-level that switches on the respective switch $211_1$-$212_2$ or an off-level that switches off the respective switch $211_1$-$212_2$. Just for the purpose of illustration, an on-level is a high signal level and an off-level is a low signal level in the waveforms shown in FIG. 7. The drive circuit 215 operates the high side switches $211_1$, $211_2$, and the low side switches $212_1$, $212_2$ of the first and second half bridge such that the alternating voltage $V22_{IN}$ generated by the switching circuit 21 alternatingly has a positive halfwave and a negative halfwave. For generating the positive halfwave, the drive circuit 215 switches on the high side switch $211_1$ of the first half bridge and the low side switch $212_2$ of the second half bridge and switches off the low side switch $212_1$ of the first half bridge and the high side switch $211_2$ of the second half bridge. For generating the negative half period, the drive circuit 215 switches on the high side switch $211_2$ of the second half bridge and the low side switch $212_1$ of the first half bridge and switches off the high side switch $211_1$ of the first half bridge and the low side switch $212_2$ of the second half bridge. A frequency of the alternating voltage $V22_{IN}$ is defined by a frequency at which the drive circuit 215 switches on and off the individual switches $211_1$-$212_2$ of the switching circuit 21. This switching frequency equals the frequency of the alternating voltage, so that the frequency $f_s$ of the alternating voltage $V22_{IN}$ can be adjusted by suitably adjusting the switching frequency of the switches $211_1$-$212_2$.

In order to avoid cross currents and in order to enable zero voltage switching (ZVS) in the switching circuit 21, there may be a dead time between switching off one of the high side switch and the low side switch and switching on the other one of the high side switch and the low side switch of one half bridge. During the dead time, each of the switches $211_1$, $212_1$, $211_2$, $212_2$ is off and the switching circuit 21 output voltage $V22_{IN}$ changes from the maximum to the minimum level, or vice versa, so that the switches $211_1$, $212_1$, $211_2$, $212_2$ can switch on when the voltage across the respective switch is zero, which is referred to as ZVS. During those dead times, a current induced by the inductors 221, 222 of the resonant circuit 22 flows through the rectifier elements of the switches in the switching circuit 21.

Referring to FIG. 5A, the rectifier 23, which receives the output voltage $V22_{OUT}$ from the resonant circuit 22, may include a passive rectifier bridge with a first half bridge and a second half bridge each including a first rectifier element $231_1$, $232_1$ and a second rectifier element $231_2$, $232_2$ that are connected in series. Each half bridge includes an input that is formed by a circuit node common to the first rectifier element $231_1$, $232_1$ and the second rectifier element $231_2$, $232_2$ forming the respective half bridge. A first output node of the resonant circuit 22 is connected to the input of the first bridge $231_1$, $231_2$, and a second output node of the resonant circuit 22 is connected to the input of the second half bridge $232_1$, $232_2$. Further, each of the first and second half bridges is connected between the first output node 17 and the second output node 18 of the main converter 2.

FIG. 5B shows another example of the auxiliary converter 2. In this auxiliary converter, the switching circuit 21 is different from the switching circuit 21 shown in FIG. 5A in that it only includes the first half-bridge $211_1$, $212_1$. A first input node of the resonant circuit 22 is connected to the output of the first half bridge and a second input node of the resonant circuit 22 is connected to the second input node 16 of the switch circuit 21 so that the input of the resonant circuit 22 is connected in parallel with the low side switch $212_1$. The drive circuit 215 operates the high side switch $211_1$ and the low side switch $212_1$ in the same way as explained with reference to FIGS. 5A and 7. That is, the signal waveforms of the drives signals $S211_1$, $S212_1$ of the high side switch $211_1$ and the low side switch $212_1$ shown in FIG. 7 apply to the switching circuit 21 shown in FIG. 5B equivalently. A signal waveform of the switching circuit output voltage $V22_{IN}$ of the switching circuit 21 shown in FIG. 5B is different from the waveform shown in FIG. 7 in that it alternates between $V2_{IN\_MAX}=+V2_{IN}$ and $V2_{IN\_MIN}=0$ instead of $V2_{IN\_MAX}=+V2_{IN}$ and $V2_{IN\_MIN}=-V2_{IN}$.

FIG. 5C shows another example of the main converter 2. In this main converter, the switching circuit 21 is different from the switching circuit 21 shown in FIG. 5A in that the second half bridge is replaced by a series circuit with a first capacitor $213_1$ and a second capacitor $213_2$. This series circuit is connected between the first input node 15 and the second input node 16 of the switching circuit 21. A circuit node common to the first capacitor $213_1$ and the second capacitor $213_2$ is connected to the second input node of the resonant circuit 22. The first input node of the resonant circuit 22 is connected to the output of the first half bridge $211_1$, $212_1$, which is the same as in the example shown in FIG. 5A. According to one example, the first capacitor $213_1$ and the second capacitor $213_2$ have substantially the same capacitance, so that a respective voltage $V213_1$, $V213_2$ across each of these capacitors $213_1$, $213_2$ is half the input voltage $V2_{IN}$, that is, $V213_1 = V213_2 = V2_{IN}$. The drive circuit 215 operates the high side switch $211_1$ and the low side switch $212_1$ of the first half bridge in the same way as explained with reference to FIGS. 5A and 7. That is, the signal waveforms of the drives signals $S211_1$, $S212_1$ of the high side switch $211_1$ and the low side switch $212_1$ shown in FIG. 7 apply to the switching circuit 21 shown in FIG. 5C equivalently. A signal waveform of the switching circuit output voltage $V22_{IN}$ of the switching circuit 21 shown in FIG. 5C is different from the waveform shown in FIG. 7 in that it alternates between $V2_{IN\_MAX} = +V2_{IN}/2$ and $V2_{IN\_MIN} = -V2_{IN}/2$ instead of $V2_{IN\_MAX} = +V2_{IN}$ and $V2_{IN\_MIN} = -V2_{IN}$.

Figure 8:
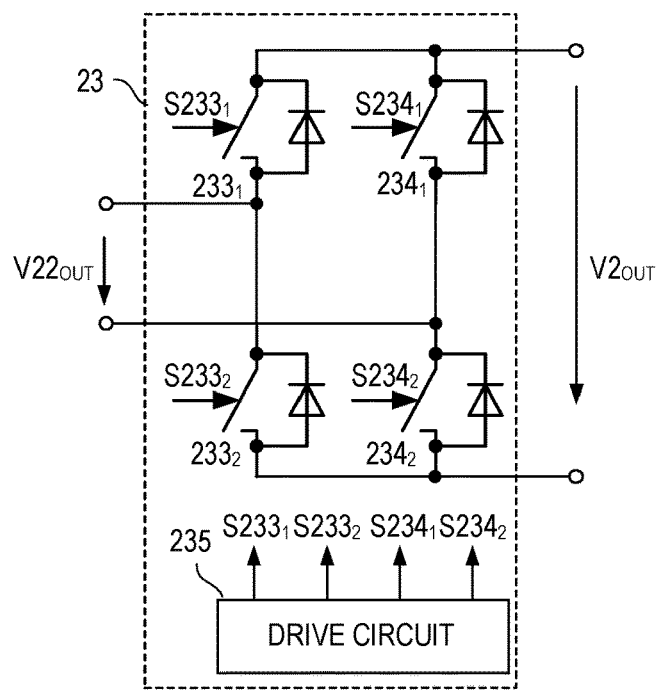
FIG. 8 is an example diagram illustrating another example of the rectifier implemented in the main converter according to embodiments herein.
Figure 9:
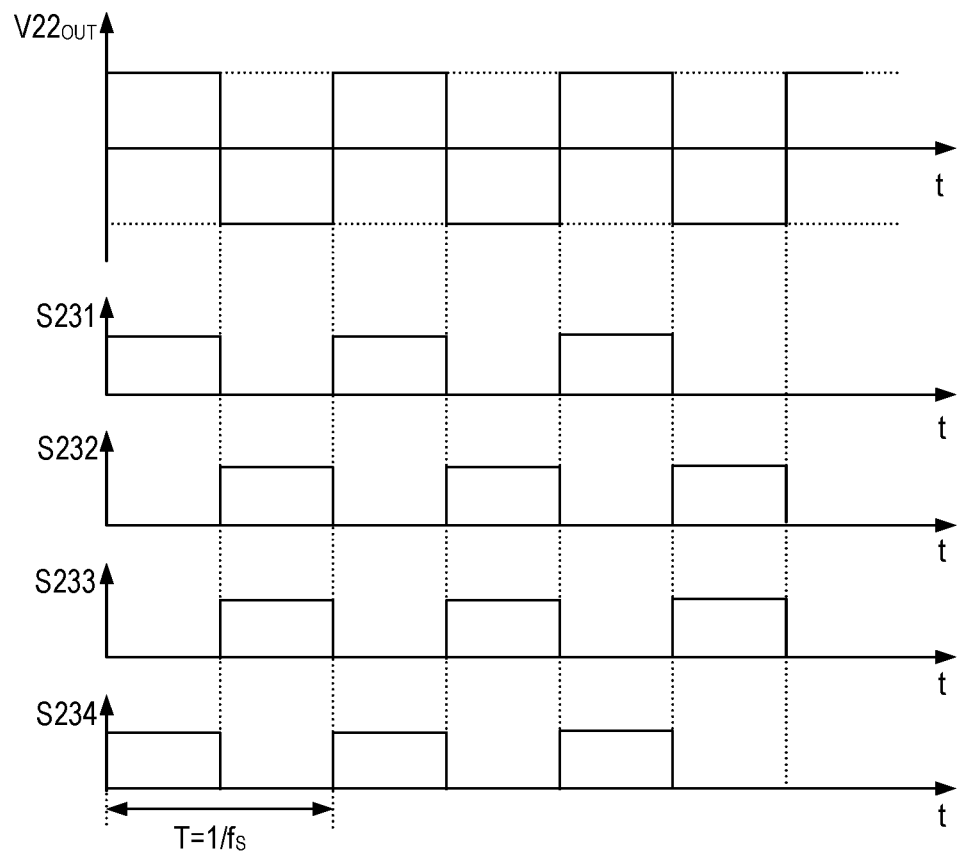
FIG. 9 is an example timing diagram that illustrates one way operation of the rectifier shown in FIG. 8 according to embodiments herein.

FIG. 8 shows a modification of the rectifier 23 shown in FIG. 5A. In the example shown in FIG. 8, the rectifier 23 includes switches or active rectifier elements $233_1$, $233_2$, $234_1$, $234_2$ that each include a switching element and a rectifier element connected in parallel with the switching element. A drive circuit 235 drives these active rectifier elements dependent on a polarity of the output voltage $V22_{OUT}$ of the resonant circuit. This is illustrated in FIG. 9 that shows timing diagrams of the resonant circuit output voltage $V22_{OUT}$ and of drive signals generated by the drive circuit 235 and received by the individual rectifier elements $233_1$-$234_2$. Referring to FIG. 9, the drive circuit 235 switches on the first rectifier element $233_1$ of the first half bridge and the second rectifier element $234_2$ of the second half bridge and switches off the second rectifier element $233_2$ of the first half bridge and the first rectifier element $234_1$ of the second half bridge during a positive half period of the output voltage $V22_{OUT}$. During a negative half period of the output voltage $V22_{OUT}$, the drive circuit 235 switches on the first rectifier element $234_1$ of the second half bridge and the second rectifier element $233_2$ of the first half bridge and the switches off the first rectifier element $233_1$ of the first half bridge and the second rectifier element $234_2$ of the second half bridge. By this, the alternating output voltage $V22_{OUT}$ is rectified, so that an output voltage $V2_{OUT}$ of the rectifier 23 is a DC voltage with a voltage level that equals an amplitude of the alternating output voltage $V22_{OUT}$ of the resonant circuit 22. Optionally, there are dead times between switching on one of the first and second rectifier element and switching off the other one of the first and second rectifier element of one half bridge. Those dead times, however, are not shown in FIG. 9.

Figure 10:
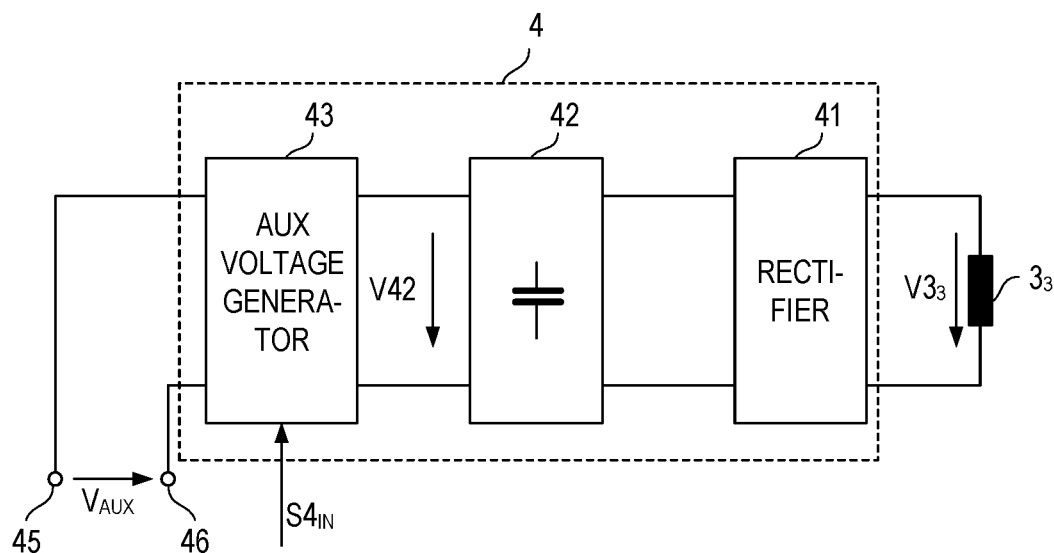
FIG. 10 is an example diagram illustrating of an auxiliary converter that includes a rectifier, a DC link circuit, and an auxiliary voltage generator according to embodiments herein.

FIG. 10 shows one example of the auxiliary converter 4. In this example, the auxiliary converter 4 includes a rectifier 41 coupled to the third winding $3_3$ of the transformer and configured to receive a voltage $V3_3$ that is available across the third winding $3_3$. This voltage is also referred to as auxiliary converter input voltage in the following. A DC link circuit 42 is connected downstream the rectifier 41. The DC link circuit 42 includes at least one capacitor and is configured to generate a DC link voltage V42 from an output voltage of the rectifier 41. An auxiliary voltage generator 43 receives the DC link voltage V42 and is configured to generate the auxiliary voltage $V_{AUX}$ based on the DC link voltage V42 and an input signal $S4_{IN}$. This input signal $S4_{IN}$ may be dependent on at least one of the input voltage $V_{IN}$ and the output voltage $V_{OUT}$ of the power converter circuit. This is explained in further detail herein below. The rectifier 41, the DC link circuit 42, and the auxiliary voltage generator 43 may be implemented in various ways. Some examples are explained in the following.

Figure 11:
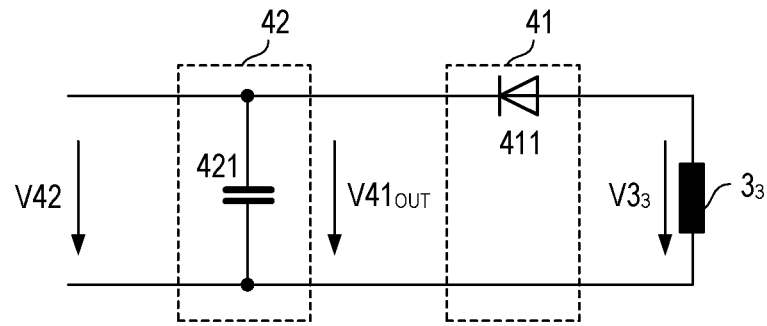
FIG. 11 is an example diagram illustrating one example of the rectifier and the DC link circuit shown in FIG. 10 according to embodiments herein.

FIG. 11 shows a rectifier 41 and a DC link circuit 42 according to one example. In this example, the rectifier 41 includes a rectifier element 411, such as a bipolar diode, connected in series with the third winding $3_3$. A series circuit with the third winding $3_3$ and the rectifier element 411 is connected in parallel with a capacitor 421 of the DC link circuit 42. In this example, the DC link voltage V42 is a voltage across this capacitor 421.

Figure 12:
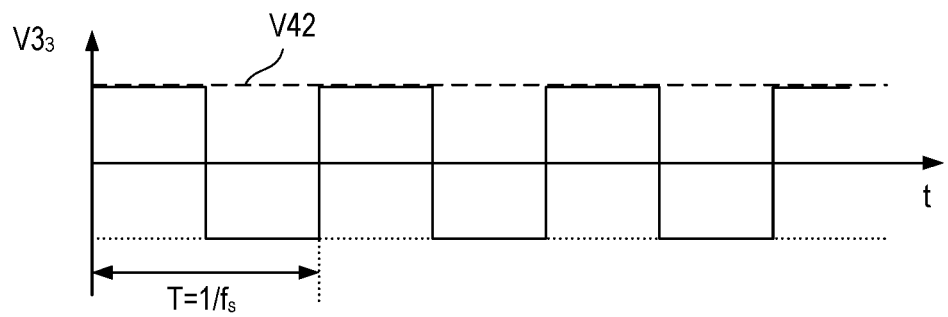
FIG. 12 is an example illustrating timing diagrams of an input voltage of the rectifier shown in FIG. 11 and an output voltage of the DC link circuit shown in FIG. 11 according to embodiments herein.

FIG. 12 shows a signal waveform of the auxiliary converter input voltage $V3_3$ according to one example. In this example, the voltage $V3_3$ has the same waveform as the input voltage $V22_{IN}$ and the output voltage $V22_{OUT}$ of the resonant circuit 22, which is an alternating rectangular voltage with the frequency $f_S$. An amplitude of this voltage $V3_3$ across the third winding $3_3$ is dependent from the input voltage $V22_{IN}$ of the resonant circuit 22 and a winding ratio of the transformer as follows:

$$V3_3 = V22_{IN} \cdot \frac{N_3}{N_1}, \quad (3)$$

where $N_1$ is the number of turns of the first winding $3_1$ and $N_3$ is the number of turns of the third winding $3_3$. Equivalently, the output voltage $V22_{OUT}$ of the resonant circuit 22 is given by $$V22_{OUT} = V22_{IN} \cdot \frac{N_2}{N_1}, \quad (4)$$

where $N_2$ is the number of turns of the second winding $3_2$. Equations (3) and (4) apply when the resonant circuit 22 is operated at its resonance frequency. A voltage level of the DC link voltage V42 obtained by the rectifier 41 and the DC link circuit 42 shown in FIG. 11 equals an amplitude of the alternating voltage $V3_3$ across the third winding $3_3$. This DC link voltage V42 is illustrated in dashed lines in FIG. 12.

Figure 13:
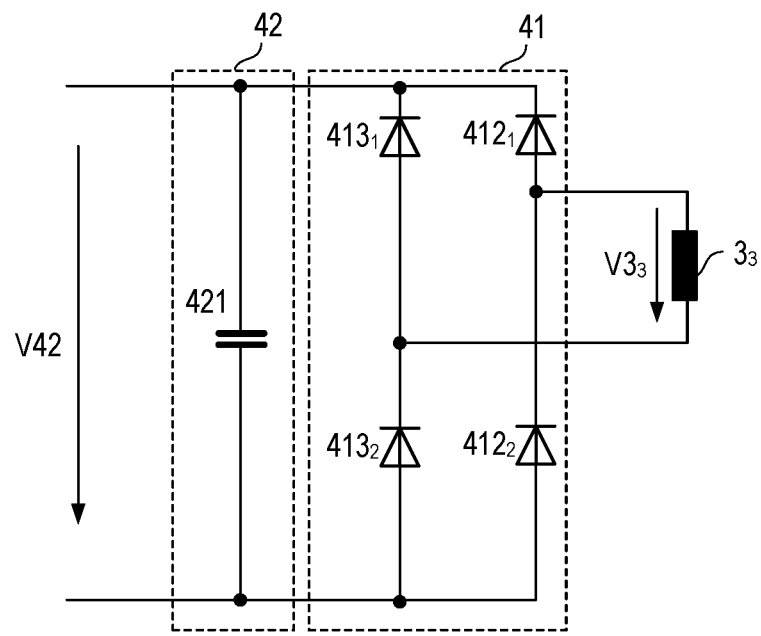
FIG. 13 is an example diagram illustrating a rectifier and a DC link circuit of the auxiliary converter according to embodiments herein.

In the circuit shown in FIG. 11, a current flows from the third winding $3_3$ to the DC link circuit 42 only during positive half periods of the voltage $V3_3$, while the rectifier element 411 blocks during negative half periods of this voltage $V3_3$. FIG. 13 shows an example of a rectifier 41 that conducts a current from the third winding $3_3$ to the DC link circuit 42 during both positive half periods and negative half periods of the auxiliary converter input voltage $V3_3$. Like the DC link circuit 42 shown in FIG. 11, the DC link circuit 42 in the example shown in FIG. 13 includes one DC link capacitor 421 across which the DC link voltage V42 is available. The rectifier 41 includes a passive rectifier bridge with a first half bridge and a second half bridge each including a series circuit with a first rectifier element $412_1$, $413_1$ and a second rectifier element $412_2$, $413_2$. Each of these half bridges is connected in parallel with the DC link circuit 42 and has an input formed by a circuit node common to the first and second rectifier element of the respective half bridge. The input of the first half bridge $412_1$, $412_2$ is connected to a first node of the third winding $3_3$, and the input of the second half bridge $413_1$, $413_2$ is connected to a second node of the third winding $3_3$. The signal waveforms shown in FIG. 12 apply to the rectifier 41 and the DC link circuit 42 shown in FIG. 13 equivalently.

Figure 14:
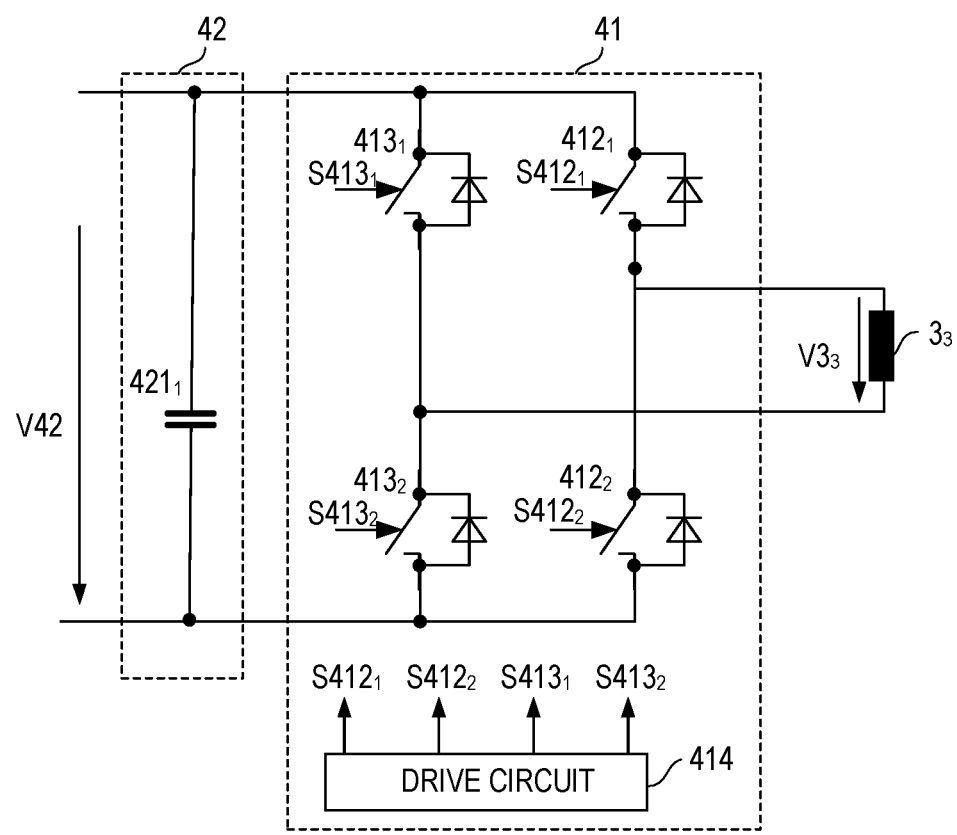
FIG. 14 is an example diagram illustrating a modification of the rectifier shown in FIG. 13 according to embodiments herein.

FIG. 14 shows a modification of the rectifier 41 shown in FIG. 13. The rectifier 41 as shown in FIG. 14 is different from the rectifier 41 shown in FIG. 13 in that it includes switches or active rectifier elements $412_1$-$413_2$ instead of passive rectifier elements, wherein each of these active rectifier elements $412_1$-$413_2$ includes a switching element and a passive rectifier element, such as a diode, connected in parallel with the switching element. A drive circuit 414 drives the individual rectifier elements $412_1$-$413_2$ by generating drive signals $S412_1$, $S412_2$, $S413_1$, $S413_2$ that are received by the active rectifier elements. According to one example, the drive circuit 414 is configured to drive the rectifier elements such that during a positive half period of the auxiliary converter input voltage $V3_3$ the first rectifier element $412_1$ of the first half bridge $412_1$, $412_2$ and the second rectifier element $413_2$ of the second half bridge $413_1$, $413_2$ are on and the second rectifier element $412_2$ of the first half bridge $412_1$, $412_2$ and the first rectifier element $413_1$ of the second half bridge $413_1$, $413_2$ are off. During the negative half period, the first rectifier element $413_1$ of the second half bridge $413_1$, $413_2$ and the second rectifier element $412_2$ of the first half bridge $412_1$, $412_2$ are on and the second rectifier element $413_2$ of the second half bridge $413_1$, $413_2$ and the first rectifier element $412_1$ of the first half bridge $412_1$, $412_2$ are off.

Figure 15:
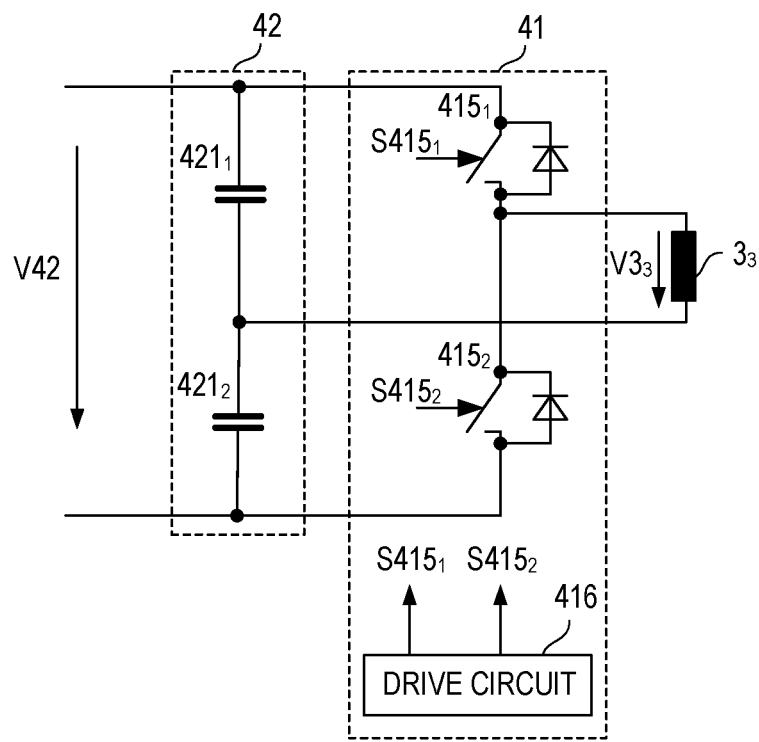
FIG. 15 is an example diagram illustrating a rectifier and a DC link circuit according to another example embodiment herein.
Figure 16:
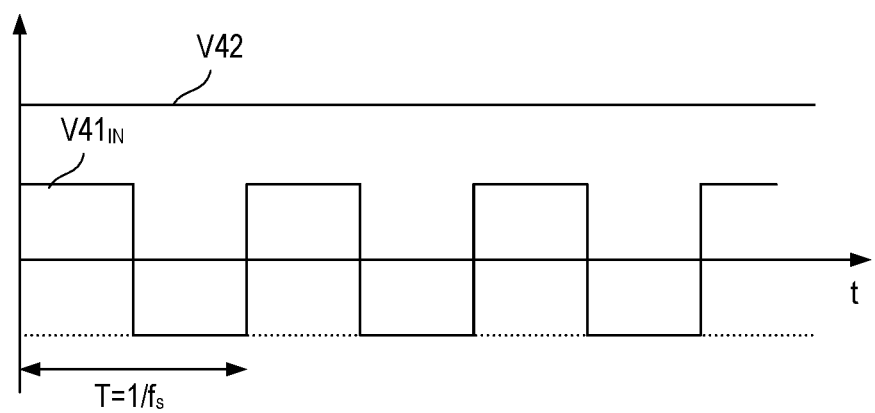
FIG. 16 is an example illustrating timing diagrams that illustrate waveforms of an input voltage of the rectifier shown in FIG. 15 and DC link voltage of the DC link circuit shown in FIG. 15 according to embodiments herein.

FIG. 15 shows a rectifier 41 and a DC link circuit 42 according to another example. In this example, the DC link circuit 42 includes a first DC link capacitor $421_1$ and a second DC link capacitor $421_2$ connected in series, and the rectifier 41 includes a first rectifier element $415_1$ and a second rectifier element $415_2$ connected in series. The DC link voltage V42 is a voltage across the series circuit with the DC link capacitors $421_1$, $421_2$. The series circuit with the DC link capacitors $421_1$, $421_2$ is connected in parallel with a series circuit including the first rectifier element $415_1$, $415_2$. The third winding $3_3$ is connected between a circuit node common to the DC link capacitors $421_1$, $421_2$ and a circuit node common to the rectifier elements $415_1$, $415_2$. The rectifier elements $415_1$, $415_2$ are active rectifier elements and each include a switching element driven by a drive circuit 416 and a passive rectifier element, such as a diode, connected in parallel with the switching element. This, however, is only an example. The active rectifier elements $415_1$, $415_2$ may be replaced by passive rectifier elements, that is, by omitting the switching elements shown in FIG. 15. The drive circuit 416 is configured to switch on the first rectifier element $415_1$ during a positive half period of the voltage $V3_3$ across the third winding $3_3$ and switch off the second rectifier element $415_2$ during the positive half period, so that during the positive half period, the first DC link capacitor $421_1$ is charged. During the negative half period, the drive circuit 416 switches off the first rectifier element $415_1$ and switches on the second rectifier element $415_2$ so that during the negative half period, the second DC link capacitor $421_2$ is charged. In this type of circuit, a voltage level of the DC link voltage V42 equals twice the amplitude of the voltage $V3_3$ across the circuit winding $3_3$. This is illustrated in FIG. 16 that shows an example of the waveform of the voltage $V3_3$ and the waveform of the resulting DC link voltage V42.

Figure 17A:
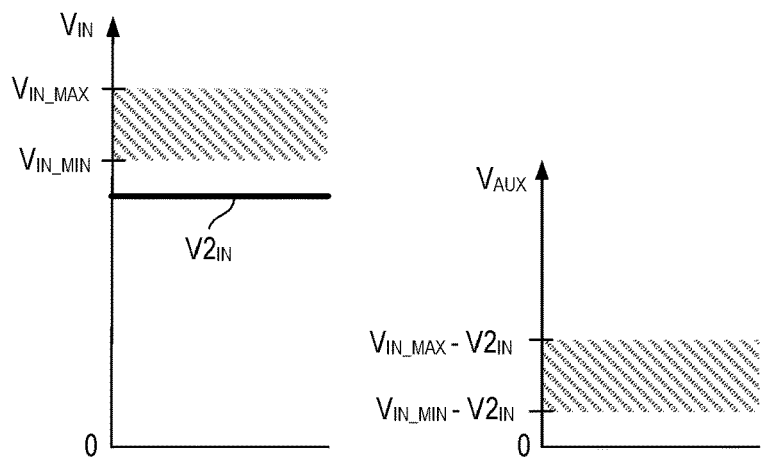
FIGS. 17A to 17C are example diagram illustrating different ways of how an auxiliary voltage may be generated by the auxiliary converter in a power converter circuit of the type shown in FIG. 1 according to embodiments herein.
Figure 17B:
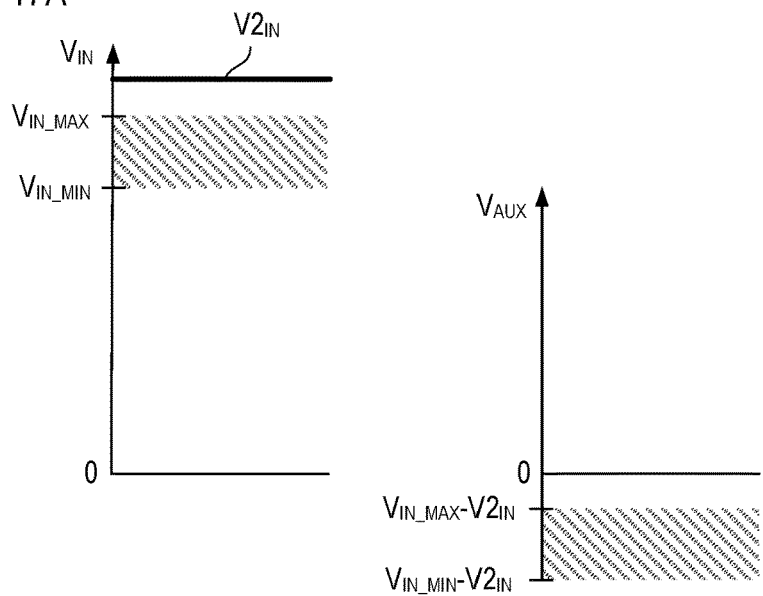
Figure 17C:
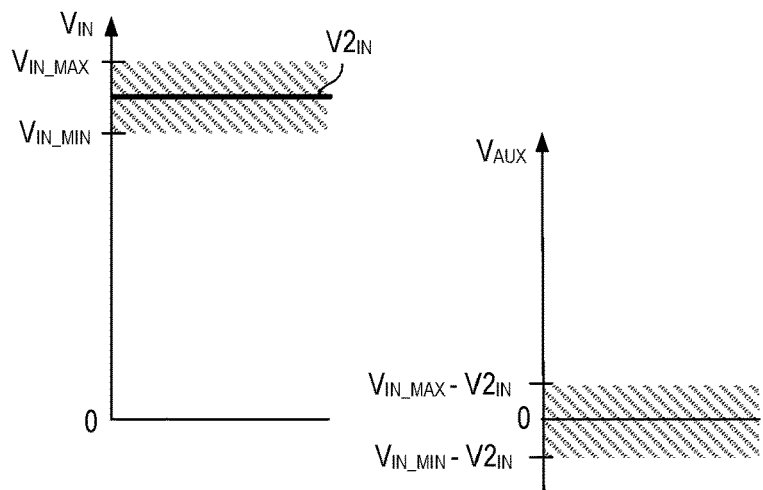

Based on the DC link voltage V42, the auxiliary voltage generator 43 may generate the auxiliary voltage $V_{AUX}$ with only one polarity or with one of two different polarities. An auxiliary voltage $V_{AUX}$ with only one polarity is referred to as unipolar auxiliary voltage $V_{AUX}$ in the following and an auxiliary voltage $V_{AUX}$ that can have two different polarities is referred to as bipolar auxiliary voltage $V_{AUX}$ in the following. FIGS. 17A-17C illustrate different examples of how the auxiliary voltage $V_{AUX}$ may be generated in a power converter circuit of the type shown in FIG. 1, and FIGS. 18A-18C show different examples of how the auxiliary voltage $V_{AUX}$ may be generated in a power converter circuit of the type shown in FIG. 2.

Referring to the above, in a power converter circuit of the type shown in FIG. 1, the auxiliary converter 4 is configured to regulate the auxiliary voltage $V_{AUX}$ such that the auxiliary voltage $V_{AUX}$ compensates for variations in the input voltage $V_{IN}$ so that the main converter input voltage $V2_{IN}$, which is given by the input voltage $V_{IN}$ minus the auxiliary voltage, is substantially constant. Further, a non-ideal behaviour of the devices implemented in the power converter circuit may result in variations of the output voltage $V_{OUT}$ even if the resonant circuit 22 is operated at the resonance frequency $f_S$ and the input voltage $V_{IN}$ is absolutely constant. Thus, regulating the auxiliary voltage $V_{AUX}$ may also become necessary in view of regulating the output voltage $V_{OUT}$. For the purpose of explanation it is assumed that the input voltage $V_{IN}$ may vary between a minimum level $V_{IN\_MIN}$ and a maximum level $V_{IN\_MAX}$. A voltage level that is in the middle between the minimum level and the maximum level is referred to as rated level $V_{IN\_RATED}$ in the following, wherein $$V_{RATED} = \tfrac{1}{2}(V_{IN_{MAX}} + V_{IN_{MIN}}) \qquad (5).$$

According to one example, the voltage level of the input voltage is between 80% and 120% or between 90% and 110% of the rated level $V_{RATED}$.

Variations of the input voltage $V_{IN}$ between the minimum level $V_{IN\_MIN}$ and the maximum level $V_{IN\_MAX}$ are schematically illustrated in each of FIGS. 17A-17C. These figures show three different scenarios of how a level of the desired main converter input voltage $V2_{IN}$ can be relative to the input voltage range. According to one example shown in FIG. 17A, the voltage level of the main converter input voltage $V2_{IN}$ is below the input voltage range, that is, the main converter input voltage $V2_{IN}$ is below the minimum input voltage level $V_{IN\_MIN}$. According to another example shown in FIG. 17B, the voltage level of the main converter input voltage $V2_{IN}$ is above the input voltage range, that is, the main converter input voltage $V2_{IN}$ is higher than the maximum input voltage level $V_{IN\_MAX}$. According to yet another example shown in FIG. 17C, the main converter input voltage $V2_{IN}$ lies within the input voltage range, that is, the main converter input voltage $V2_{IN}$ is lower than the maximum input voltage level $V_{IN\_MAX}$ and higher than the minimum input voltage level $V_{IN\_MIN}$.

In the scenarios shown in FIGS. 17A and 17B, a unipolar auxiliary voltage $V_{AUX}$ is required to regulate the main converter input voltage $V2_{IN}$ and the output voltage $V_{OUT}$, wherein this unipolar auxiliary voltage $V_{AUX}$ is a positive voltage in the example shown in FIG. 17A and a negative voltage in the example shown in FIG. 17B. In the scenario shown in FIG. 17C, a bipolar auxiliary voltage $V_{AUX}$ is required to regulate the main converter input voltage $V2_{IN}$ and the output voltage $V_{OUT}$. In each of the examples shown in FIGS. 17A-17C, a voltage range of the auxiliary voltage $V_{AUX}$ is dependent on the input voltage range and the desired voltage level of the main converter input voltage $V2_{IN}$. In each of these examples shown in FIGS. 17A-17C, the auxiliary voltage $V_{AUX}$ is to be generated such that it varies between $V_{IN\_MAX}-V2_{IN}$ and $V_{IN\_MIN}-V2_{IN}$ in order to compensate for variations of the input voltage $V_{IN}$. In the example shown in FIG. 17A, this auxiliary voltage range only includes positive voltages, in the example shown in FIG. 17B, this auxiliary voltage range only includes negative voltages, and in the example shown in FIG. 17C, this auxiliary voltage range includes both positive voltages and negative voltages. FIGS. 17A-17C only illustrate voltage ranges of the auxiliary voltage $V_{AUX}$. Examples of how the auxiliary voltage $V_{AUX}$ is generated in order to regulate the main converter input voltage $V2_{IN}$ and the output voltage $V_{OUT}$ are explained herein further below.

Figure 18A:
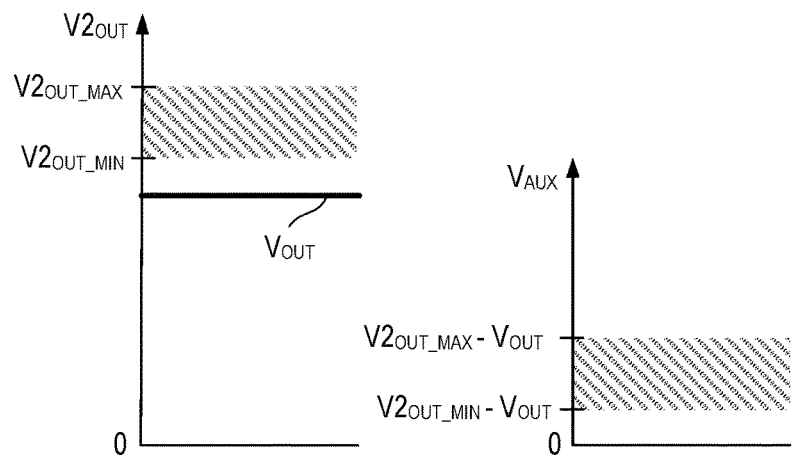
FIGS. 18A to 18C are example diagrams illustrating different ways of how an auxiliary voltage may be generated by the auxiliary converter in a power converter circuit of the type shown in FIG. 2 according to embodiments herein.
Figure 18B:
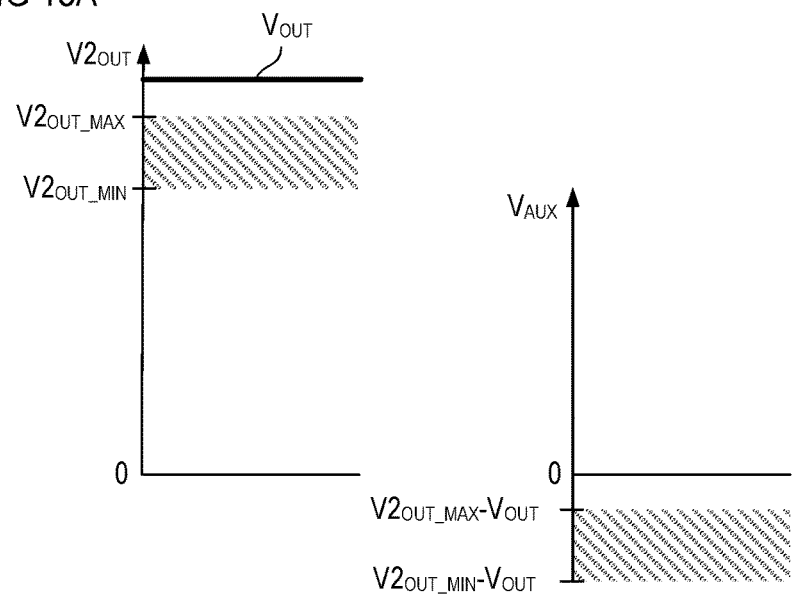
Figure 18C:
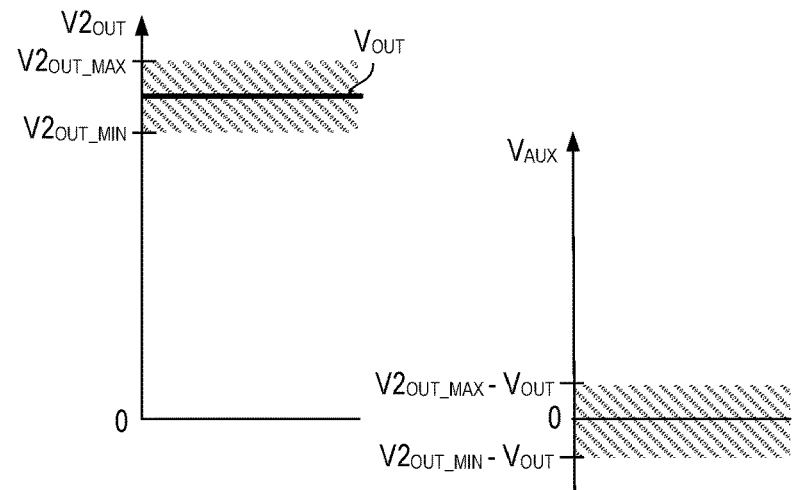

In the example shown in FIG. 2, the main converter input voltage $V2_{IN}$ equals the input voltage $V_{IN}$, so that variations of the input voltage $V_{IN}$ may result in variations of the main converter input voltage $V2_{IN}$ and, therefore, the main converter output voltage $V2_{OUT}$. For the purpose of explanation, it is assumed, that the main converter output voltage $V2_{OUT}$, due to variations of the input voltage $V_{IN}$ between $V_{IN\_MAX}$ and $V_{IN\_MIN}$, varies between $V2_{OUT\_MAX}$ and $V2_{OUT}$ MIN. Such voltage range of the main converter output voltage $V2_{OUT}$ is schematically illustrated in FIGS. 18A-18C.

These figures illustrate different scenarios of how the desired voltage level of the output voltage $V_{OUT}$ may be relative to the voltage range of the main converter output voltage $V2_{OUT}$. In the example shown in FIG. 18A, the output voltage $V_{OUT}$ is below the minimum main converter output voltage level $V2_{OUT}$ MIN. In the example shown in FIG. 18B, the output voltage $V_{OUT}$ is above the maximum main converter output voltage level $V2_{OUT\_MAX}$, and in the example shown in FIG. 18C, the output voltage $V_{OUT}$ is below the maximum main converter output voltage level $V2_{OUT\_MAX}$ and above the minimum main converter output voltage level $V2_{OUT\_MIN}$. In each of these examples, the auxiliary voltage $V_{AUX}$ is to be generated such that it is in a voltage range of between $V2_{OUT\_MAX}-V_{OUT}$ and $V2_{OUT\_MIN}-V_{OUT}$. The absolute voltage levels of the auxiliary voltage $V_{AUX}$, however, are dependent on the relationship between the voltage range of the main converter output voltage $V2_{OUT}$ and the desired output voltage $V_{OUT}$. In the example shown in FIG. 18A, the auxiliary voltage $V_{AUX}$ is to be generated such that it only includes positive voltages, in the example shown in FIG. 18B, the auxiliary voltage $V_{AUX}$ is to be generated such that it only includes negative voltages, and in the example shown in FIG. 18C, the auxiliary voltage is to be generated such that it includes both positive voltages and negative voltages, dependent on the instantaneous level of the main converter output voltage $V2_{OUT}$.

Figure 19A:
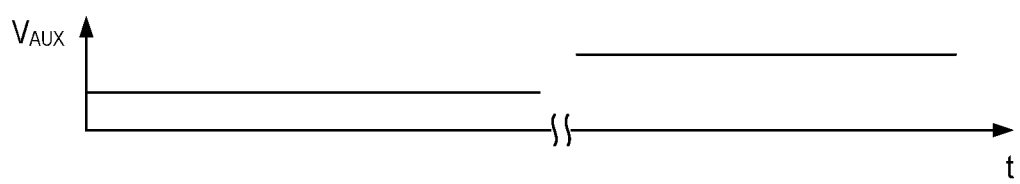
FIGS. 19A and 19B are example timing diagrams that illustrate signal waveforms of a continuous auxiliary voltage and a pulse-width modulated (PWM) auxiliary voltage, respectively according to embodiments herein.
Figure 19B:
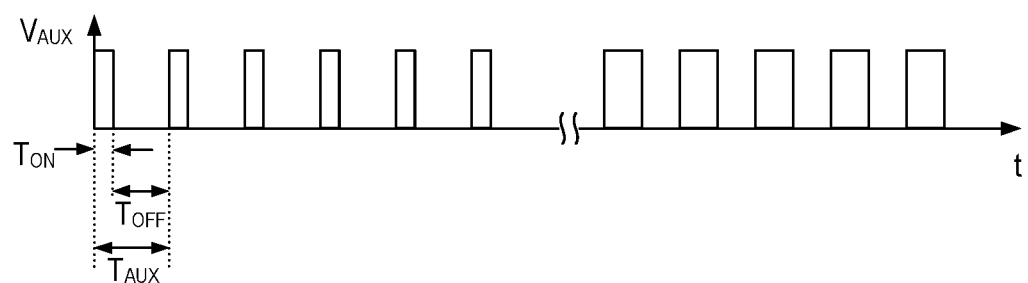

According to one example shown in FIG. 19A, the auxiliary converter 4 is configured to generate the auxiliary voltage $V_{AUX}$ as a continuous voltage with a variable voltage level. For the purpose of illustration, two different voltage levels are illustrated in FIG. 19A. According to another example, shown in FIG. 19B, the auxiliary converter 4 is configured to generate the auxiliary voltage $V_{AUX}$ with a pulse width-modulated (PWM) waveform. This type of auxiliary voltage $V_{AUX}$ includes a plurality of successive voltage pulses of a certain duration, that is referred to as on-period $T_{ON}$ in the following, and separated by pause-periods $T_{OFF}$. According to one example, the voltage pulses are generated periodically with a frequency $f_{AUX}$, wherein a reciprocal $1/f_{AUX}=T_{AUX}$ equals the duration of one period of the auxiliary voltage $V_{AUX}$, wherein one period includes one on-period and one off-period. In case of a PWM auxiliary voltage $V_{AUX}$, an average voltage level of the auxiliary voltage $V_{AUX}$ is controlled or regulated by varying a duration of the on-periods $T_{ON}$. The latter is equivalent to varying a duty cycle of the PWM auxiliary voltage $V_{AUX}$, wherein the duty cycle is given by $T_{ON}/T_{AUX}$, wherein $T_{AUX}$ is the reciprocal of the pulse frequency $f_{AUX}$. In the examples shown in FIGS. 19A and 19B, only one polarity of the auxiliary voltage $V_{AUX}$ is shown. This, however, is only an example. Dependent on the specific type of auxiliary converter 4, the auxiliary voltage $V_{AUX}$ may have only one polarity or may have two different polarities.

Figure 20:
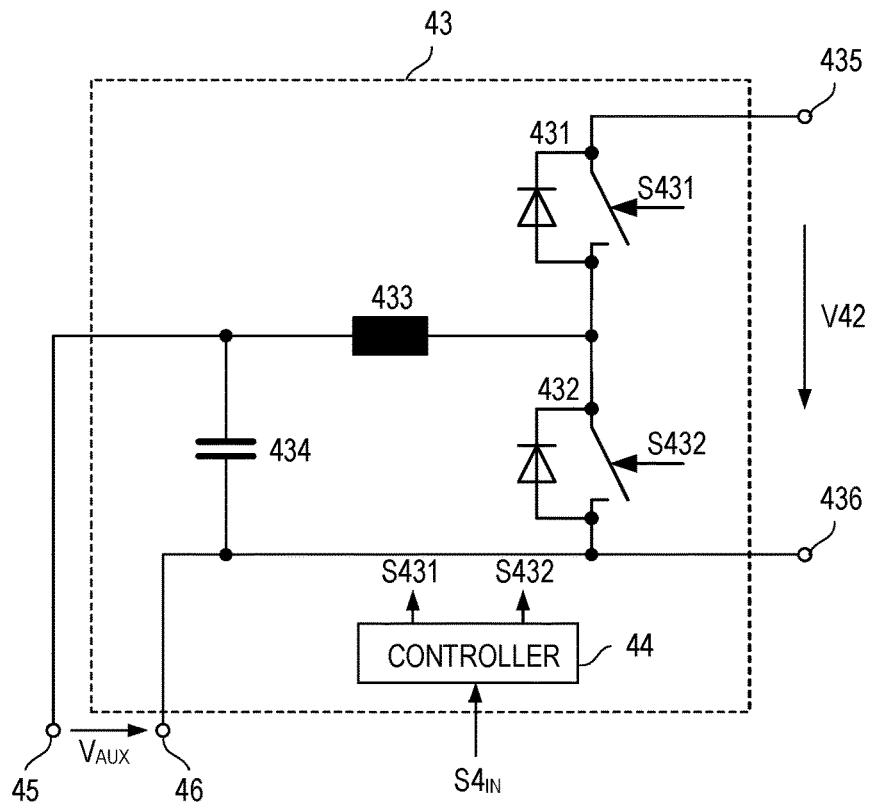
FIG. 20 is an example diagram illustrating of an auxiliary voltage generator configured to generate a continuous auxiliary voltage according to embodiments herein.

One example of the auxiliary voltage generator 43 is illustrated in FIG. 20. The auxiliary voltage generator 43 shown in FIG. 20 is configured to generate a continuous auxiliary voltage $V_{AUX}$ with one polarity. This auxiliary voltage generator 43 includes a buck converter with an output capacitor 434 connected between the output nodes 45, 46 of the auxiliary voltage converter 4. The output capacitor 434 is connected in series with an inductor 433, and an electronic switch 431 is connected in series with the inductor 433. A series circuit with the capacitor 434, the inductor 433 and the electronic switch 431 is connected between the input nodes 435, 436 of the auxiliary voltage converter 43. The auxiliary voltage generator 43 receives the DC link voltage V43 at these input nodes 435, 436. Further, a freewheeling element 432 is connected in parallel with a series circuit including the capacitor 434 and the inductor 433. The freewheeling element 432 is an active freewheeling element with a switching element and a parallel rectifier element in the example shown in FIG. 20. This, however, is only an example. A passive rectifier element (which may be obtained by omitting the switching element in the example shown in FIG. 20) may be used as well.

Referring to FIG. 20, a controller 44 receives the input signal $S4_{IN}$ of the auxiliary voltage converter 4 and controls the electronic switch 431 and, optionally, the active rectifier element 432 based on this input signal $S4_{IN}$. Controlling the electronic switch 431 and the rectifier element 432 includes generating drive signals S431, S432 for the electronic switch 431 and the rectifier element 432 by the controller 44. According to one example, the input signal $S4_{IN}$ represents the output voltage $V_{OUT}$. According to one example, the input signal $S4_{IN}$ is proportional to the output voltage $V_{OUT}$. The input signal $S4_{IN}$ may be generated by a voltage measurement circuit (not shown in the drawings) configured to measure the output voltage $V_{OUT}$ and generate the input signal $S4_{IN}$ such that it is dependent on the output voltage $V_{OUT}$ or even proportional to the output voltage $V_{OUT}$.

Figure 21:
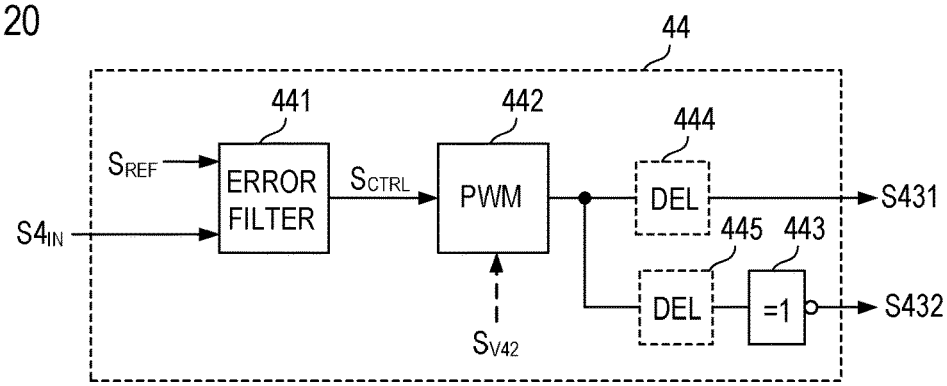
FIG. 21 is an example diagram illustrating a controller of the auxiliary voltage generator shown in FIG. 20 according to embodiments herein.
Figure 22:
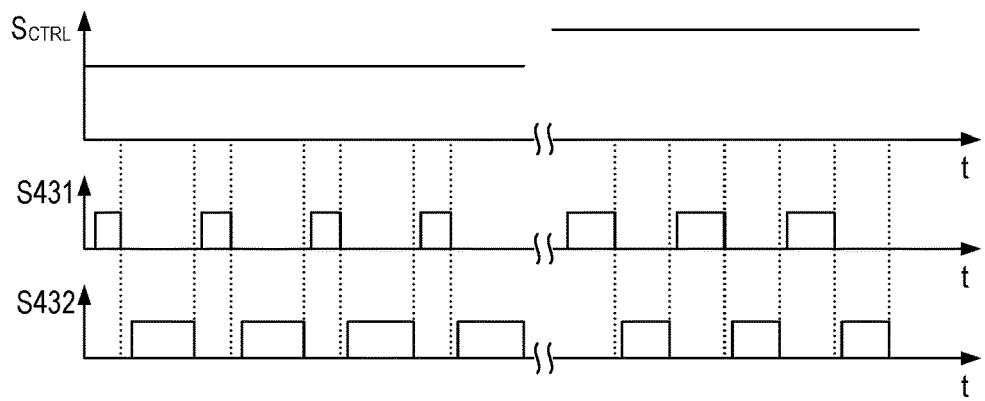
FIG. 22 are example timing diagrams illustrating one way of operation of the auxiliary voltage generator shown in FIG. 20 according to embodiments herein.

A controller 44 configured to drive the electronic switch 431 based on an input signal $S4_{IN}$ representing the output voltage $V_{OUT}$ is shown in FIG. 21. Referring to FIG. 21, the controller includes an error filter 441 that receives the input signal $S4_{IN}$ and a reference signal $S_{REF}$. The reference signal $S_{REF}$ represents a desired voltage level of the output voltage $V_{OUT}$. According to one example, the error filter 441 calculates a difference between the reference signal $S_{REF}$ and the input signal $S4_{IN}$ and generates a control signal $S_{CTRL}$ based on this difference. Generating the control signal $S_{CTRL}$ may include filtering a signal that represents the difference between the reference signal $S_{REF}$ and the input signal $S4_{IN}$. Filtering may include filtering the difference signal using one of a proportional (P) filter, an integral (I) filter, a proportional-integral (PI) filter, or a proportional-integral-derivative (PID) filter. A pulse width modulator (PWM) receives the control signal $S_{CTRL}$ and generates a pulse width modulated drive signal S431 for the electronic switch 431 based on the control signal $S_{CTRL}$. A duty cycle of this drive signal S431 is dependent on the control signal $S_{CTRL}$. This is schematically illustrated in FIG. 22 that shows timing diagrams of the drive signal S431 of the electronic switch and the control signal $S_{CTRL}$ at two different signal levels of the control signal $S_{CTRL}$. FIG. 22 also shows a timing diagram of the drive signal S432 received by the active rectifier element 432. The drive signal S432 of the active rectifier element 432 is complementary to the drive signal of the electronic switch 431, so that at one time only one of the electronic switch 431 and the active rectifier element 432 is switched on. The controller 44 shown in FIG. 21 regulates the auxiliary voltage $V_{AUX}$ by controlling the duty cycle of the drive signal S431 of the electronic switch 431. In particular, the controller 44 shown in FIG. 21 is configured to vary the auxiliary voltage $V_{AUX}$ between zero, which is when the duty cycle of the drive signal S431 is zero, and the DC link voltage V42, which is when the duty cycle of the drive signal S431 is one.

According to one example (illustrated in dashed lines in FIG. 21) the PWM 442 further receives a DC link voltage signal $S_{V42}$ that represents the DC link voltage V42 and takes into account the DC link voltage signal $S_{V42}$ in the generation of the drive signal S431. According to one example, the PWM, at a given level of the control signal $S_{CTRL}$, decreases the duty cycle of the drive signal S431 if the DC link voltage signal $S_{V42}$ indicates that the DC link voltage V42 increases and increases the duty cycle of the drive signal S431 if the DC link voltage signal $S_{V42}$ indicates that the DC link voltage V42 decreases.

According to one example, the control signal $S_{CTRL}$ is generated such that it represents a desired signal level of the auxiliary voltage $V_{AUX}$. Besides filtering a difference between the input signal $S4_{IN}$ and the reference signal $S_{REF}$ a control signal $S_{CTRL}$ representing a desired signal level of the auxiliary voltage $V_{AUX}$ can be generated by a calculation unit inside the error filter. In an example, in which the PWM 442 receives the DC link voltage signal $S_{V42}$ and the control signal $S_{CTRL}$ represents the desired signal level of the auxiliary voltage the PWM 442 may simply calculate the duty cycle of the drive signal S431 based on the control signal $S_{CTRL}$ and the duty cycle signal $S_{V42}$. In general, the auxiliary voltage $V_{AUX}$ in an auxiliary voltage generator 43 of the type shown in FIG. 20 is given by:

$$V_{AUX} = d \cdot V42 => d = \frac{V_{AUX}}{V42}, \qquad (6)$$

wherein d is the duty cycle of the drive signal S432. Thus, based on $S_{CTRL}$ representing the desired level of the auxiliary voltage $V_{AUX}$ and the duty cycle signal $S_{V42}$ representing the DC link voltage V42 the duty cycle d can be calculated by the PWM.

Referring to FIG. 21, an output signal of the PWM 442 may be used as the drive signal S431 of the electronic switch 431. Further, the PWM output signal may be inverted using an inverter 443, and the output signal of the inverter may be used as the drive signal S432 of the active rectifier element. Optionally, there are delay elements 444, 445 that cause delay times between switching off the electronic switch 431 and switching on the rectifier element 432 and between switching off the rectifier element 432 and switching on the electronic switch 431. Those delay elements help to avoid cross currents in the series circuit including the electronic switch 431 and the rectifier element 432. Delay times caused by these delay elements 444, 445 are illustrated in the signal diagrams shown in FIG. 22. According to one example, the delay elements 444, 445 are configured to delay rising edges of an output signal of the PWM, while falling edges are not delayed. A delay time introduced by these delay elements 444, 445 defines the dead time. Alternatively, the delay elements 444, 445 are configured to delay falling edges of an output signal of the PWM, while rising edges are not delayed.

An auxiliary voltage generator 43 of the type illustrated in FIGS. 20 and 21 may be used in an auxiliary voltage converter 4 connected as shown in FIG. 1 and in an auxiliary voltage converter 4 connected as shown in FIG. 2. In each case, the DC link voltage V42 is to be generated such that based on the DC link voltage V42, the auxiliary voltage $V_{AUX}$ can be generated such that it can be varied in the desired auxiliary voltage range, as explained with reference to FIGS. 17A to 17C and 18A to 18C. If the auxiliary voltage converter 4 is connected as in the example shown in FIG. 1, where the auxiliary voltage converter 4 compensates for variations of the input voltage $V_{IN}$, a higher DC link voltage V42 is required then in an auxiliary voltage converter 4 connected as in the example shown in FIG. 2, where the auxiliary voltage converter 4 compensates for variations of the main converter output voltage $V2_{OUT}$. Referring to the above, the DC link voltage V42 is dependent on the voltage $V3_3$ across the third winding $3_3$, so that by suitably adjusting the number of turns of the third winding $3_3$ relative to the number of turns of the first winding $3_1$, the DC link voltage V42 can be adjusted.

Referring to the above, the input signal $S4_{IN}$ of the auxiliary converter 4 can be dependent on the output voltage $V_{OUT}$ so that in this example the output voltage $V_{OUT}$ is directly regulated. According to another example, in an auxiliary converter connected as shown in FIG. 1, the auxiliary converter input signal $S4_{IN}$ can be generated such that it is dependent on the main converter input voltage $V2_{IN}$ and, in particular, that it is proportional to the main converter input voltage $V2_{IN}$, wherein the reference signal ($S_{REF}$ in FIG. 21) is chosen such that it represents a desired signal level of the main converter input voltage $V2_{IN}$. In this case, the main converter input voltage $V2_{IN}$ is regulated. By virtue of the main converter output voltage $V2_{OUT}$ being proportional to the main converter input voltage $V2_{IN}$ and the output voltage $V_{OUT}$ of the power converter circuit being equal the main converter output voltage $V2_{OUT}$, regulating the main converter input voltage $V2_{IN}$ is equivalent to regulating output voltage $V_{OUT}$.

The auxiliary voltage generator 43 shown in FIG. 20 is configured to generate an auxiliary voltage $V_{AUX}$ with a positive voltage level. A unipolar auxiliary voltage $V_{AUX}$ with a negative voltage level can be generated by this auxiliary voltage converter 43 by simply changing the output nodes 45, 46.

Figure 23:
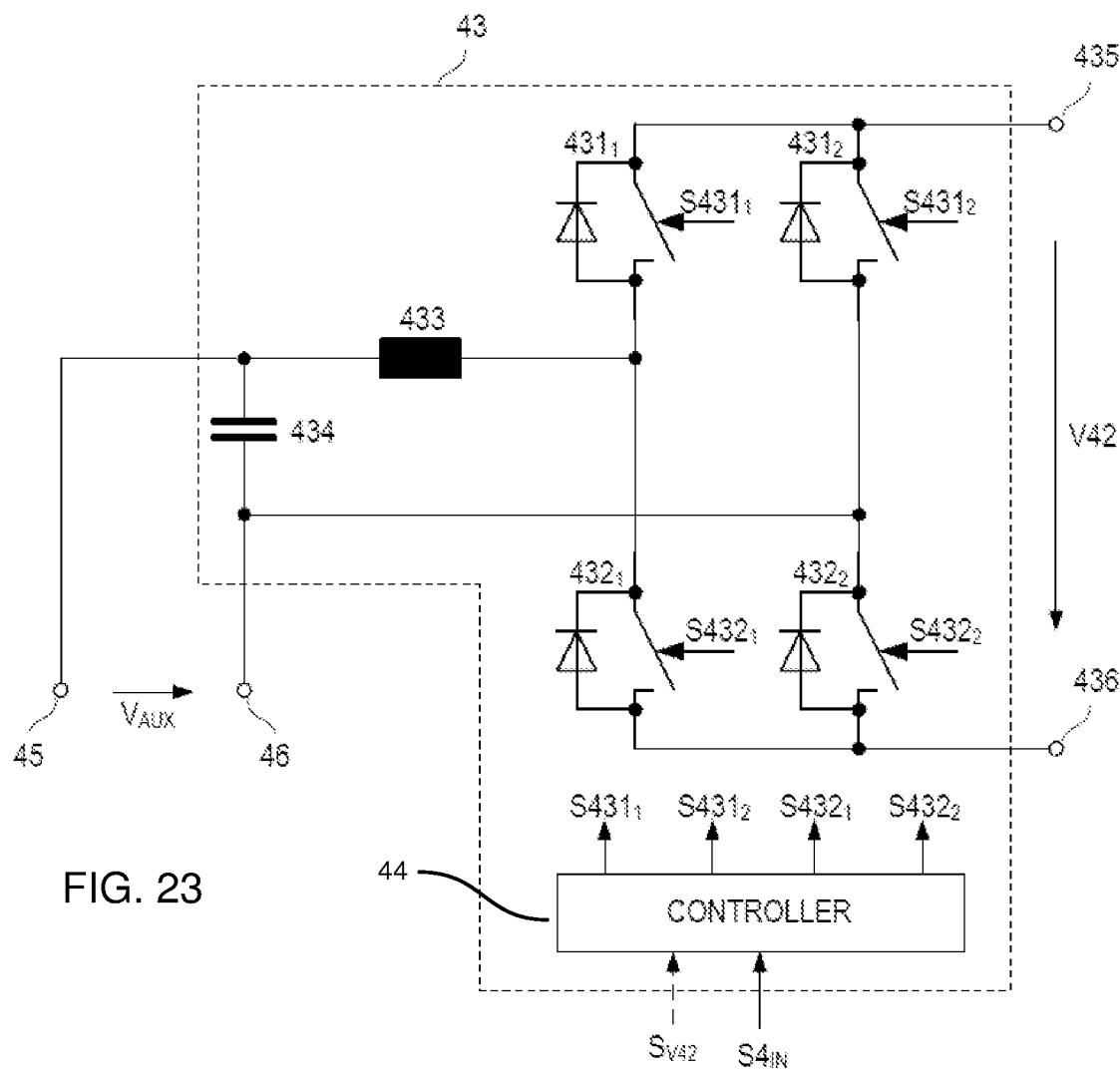
FIG. 23 is an example diagram illustrating an auxiliary voltage generator according to another example configured to generate a continuous auxiliary voltage according to embodiments herein.

FIG. 23 shows one example of an auxiliary voltage generator 43 configured to generate a bipolar auxiliary voltage $V_{AUX}$. In this example, the auxiliary voltage generator 43 includes a bridge circuit with a first half bridge and a second half bridge each including a high side switch $431_1$, $431_2$ and a low side switch $432_1$, $432_2$. Each of these high side switches $431_1$, $431_2$ and low side switches $432_1$, $432_2$ includes a switching element and a rectifier element, such as a diode, connected in parallel with the switching element. Each of these half bridges is connected between the input nodes 435, 436 of the auxiliary voltage generator. A series circuit including the capacitor 434 and the inductor 433 is connected between a circuit node common to the high side switch $431_1$ and the low side switch $432_1$ in the first half bridge and a circuit node common to the high side switch $431_2$ and the low side switch $432_2$ in the second half bridge.

Figure 24:
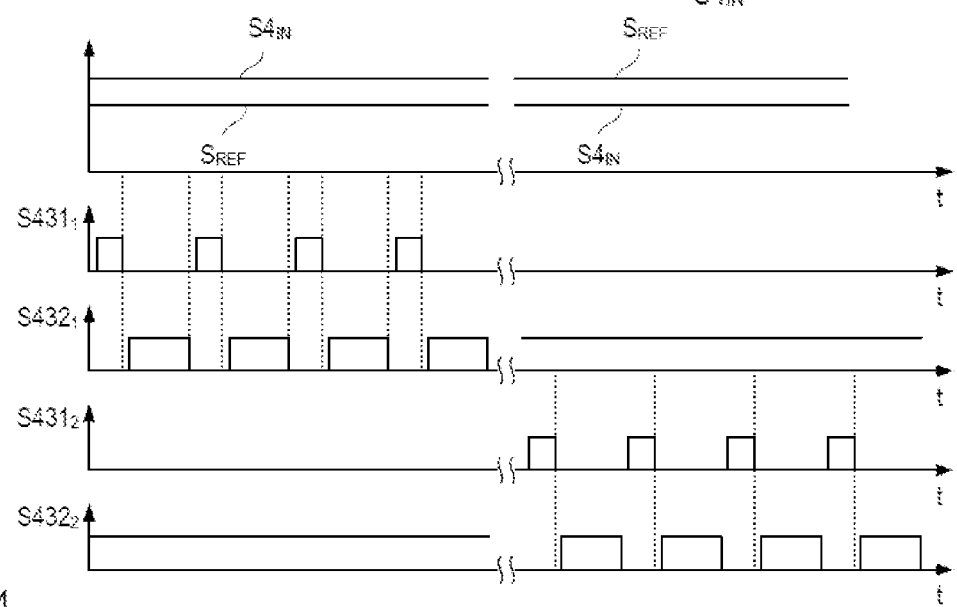
FIG. 24 are example timing diagrams illustrating one way of operation of the auxiliary voltage generator shown in FIG. 23 according to embodiments herein.

A controller 44 controls the high side switches $431_1$, $431_2$ and the low side switches $432_1$, $432_2$ by generating drive signals $S431_1$, $S431_2$ and $S432_1$, $S432_2$ based on the input signal $S4_{IN}$. Based on a polarity of a difference between the input signal $S4_{IN}$ and the reference signal $S_{REF}$, the controller 44 operates one of the first and second half bridges in a PWM fashion and statically operates the other half bridge such that the low side switch is switched on and the high side switch is switched off. This is illustrated in FIG. 24 which shows timing diagrams of the drive signal S431$_1$, S431$_2$, S432$_1$, S431$_2$ generated by the controller 44. Operating one of the first and second half bridges in the PWM fashion may include adjusting the duty cycle of the respective half bridge operated in the PWM fashion in accordance with one of the examples explained with reference to FIGS. 21 and 22.

For example, if the difference between the input signal S4$_{IN}$ and the reference signal S$_{REF}$ indicates that the auxiliary voltage V$_{AUX}$ is to be generated with a first polarity (positive), the controller 44 operates the high side switch 431$_1$ and the low side switch 432$_1$ of the first half bridge in a PWM fashion, wherein the high side switch 431$_2$ of the second half bridge is switch off and the low side switch 432$_2$ of the second half bridge is switched on. When a polarity of the difference between the input signal S4$_{IN}$ and the reference signal S$_{REF}$ indicates that an auxiliary voltage V$_{AUX}$ with a second polarity (negative) is to be generated, the controller 44 operates the high side switch 431$_2$ and the low side switch 432$_2$ of the second half bridge in a PWM fashion, while the high side switch 431$_1$ of the first half bridge is switched off and the low side switch 432$_1$ of the first half bridge is switched on.

Figure 25:
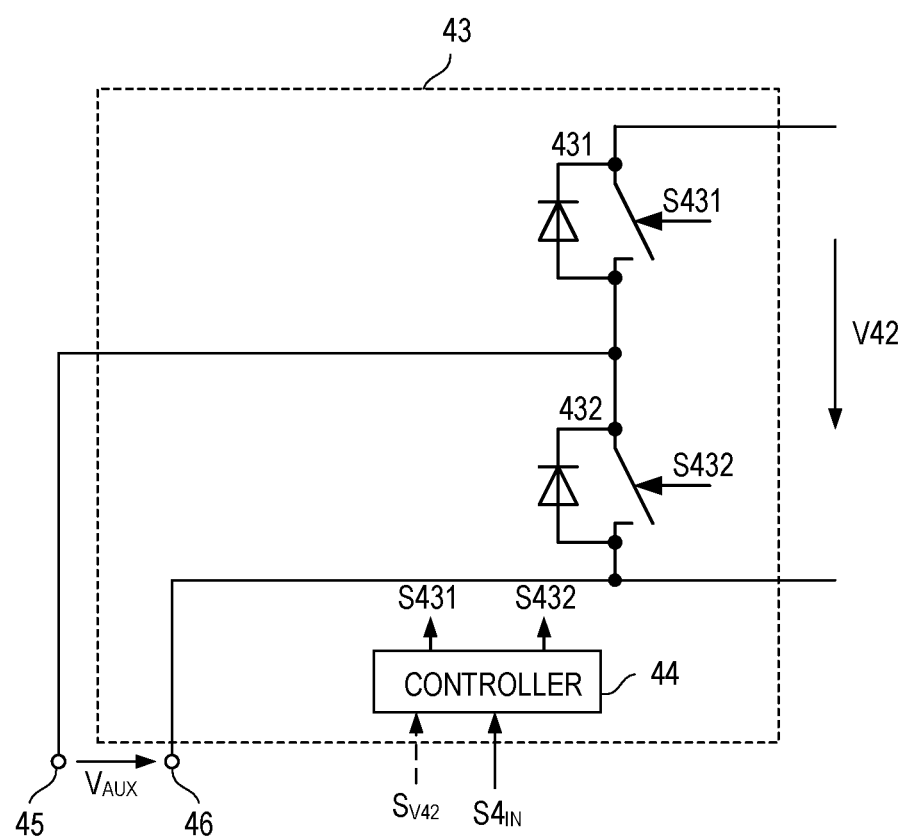
FIG. 25 is an example diagram illustrating an auxiliary voltage generator configured to generate a PWM auxiliary voltage according to embodiments herein.

One example of an auxiliary voltage generator 43 configured to generate a PWM auxiliary voltage is shown in FIG. 25. This auxiliary voltage generator 43 is based on the auxiliary voltage generator shown in FIG. 20 and is obtained from the auxiliary voltage generator 43 shown in FIG. 20 by omitting the inductor 433 and the capacitor 434. The auxiliary voltage V$_{AUX}$ provided by this auxiliary voltage generator 43 is either zero or the DC link voltage V42. The controller 44 may be identical to the controller 44 shown in FIG. 21.

Figure 26:
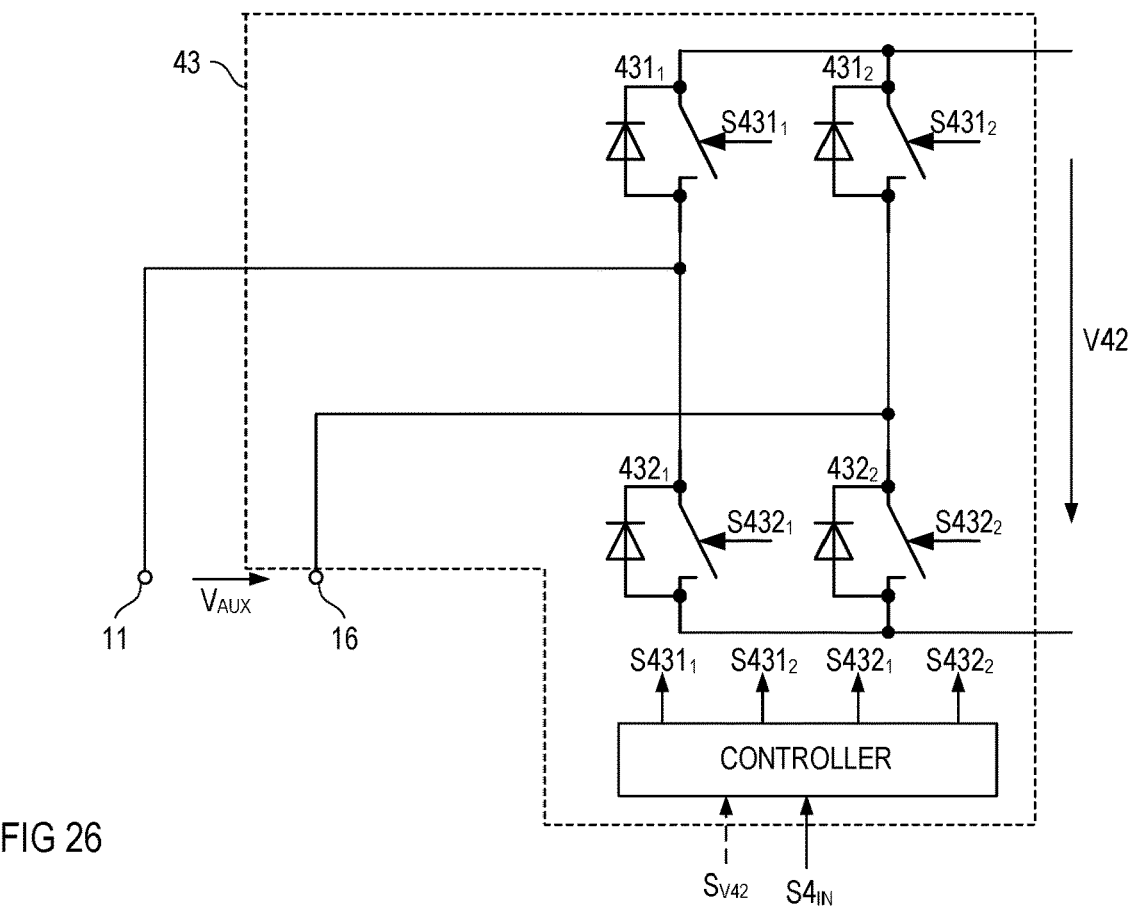
FIG. 26 is an example diagram illustrating of an auxiliary voltage generator configured to generate a PWM auxiliary voltage according to embodiments herein.

The auxiliary voltage generator 43 shown in FIG. 25 generates the auxiliary voltage V$_{AUX}$ with one polarity. An auxiliary voltage generator 43 configured to generate the auxiliary voltage V$_{AUX}$ with one of two different polarities is shown in FIG. 26. This auxiliary voltage generator is based on the auxiliary voltage generator shown in FIG. 23 and is obtained by omitting the capacitor 434 and the inductor 433.

Figure 27:
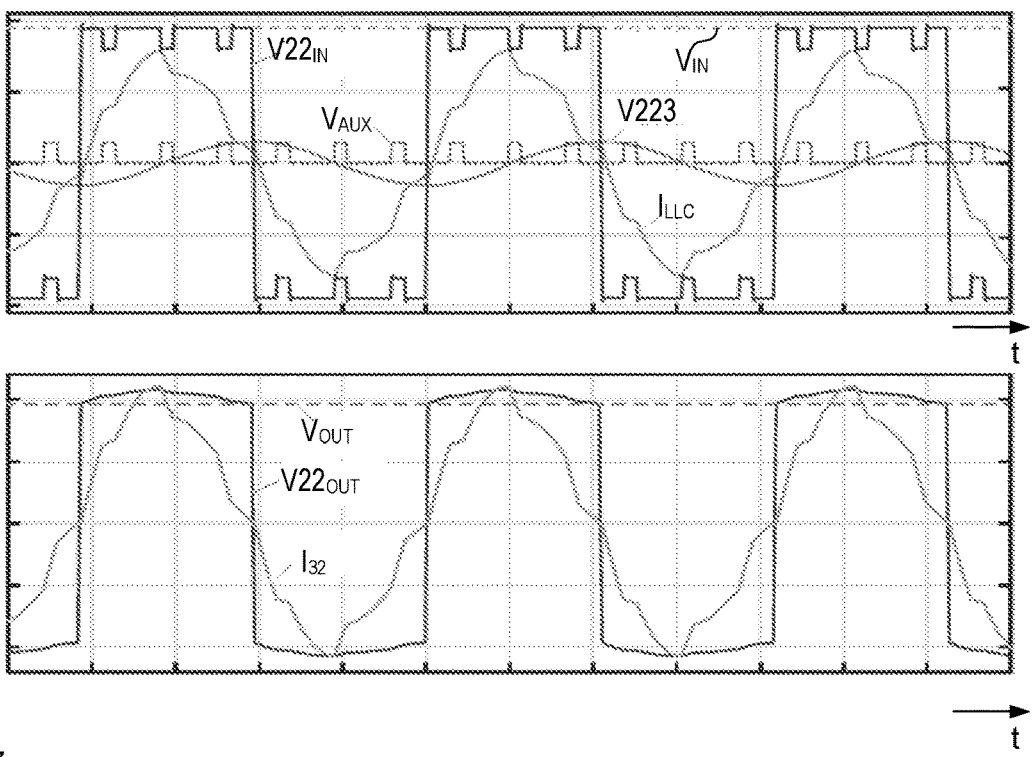
FIG. 27 are example diagrams illustrating timing of signals occurring in the main converter shown in FIGS. 5A, 5B, 5C, and 5D when the auxiliary voltage is PWM voltage with a frequency higher than a frequency of an alternating voltage received by the resonant converter according to embodiments herein.

FIG. 27 shows timing diagrams of the main converter input voltage V22$_{IN}$, the auxiliary voltage V$_{AUX}$, and the main converter output voltage V22$_{OUT}$ in a power converter of the type shown in FIG. 1 when implemented with a resonant converter circuit of one of the types shown in FIGS. 5A to 5C and an auxiliary voltage generator 43 of the type shown in FIG. 25. In this example, the auxiliary converter 4 is configured to generate the auxiliary voltage V$_{AUX}$ as a PWM voltage, wherein a frequency f$_{AUX}$ of the auxiliary voltage V$_{AUX}$ is an integer multiple of the frequency f$_S$ of the main converter input voltage V22$_{IN}$ and the main converter output voltage V22$_{OUT}$. This, however, is only an example. It is not necessary that the frequency of the auxiliary voltage V$_{AUX}$ is an integer multiple of the switching frequency f$_S$ of the main converter input voltage V22$_{IN}$. Further, it is necessary that the PWM auxiliary voltage V$_{AUX}$ and the main converter input voltage V22$_{IN}$ are synchronized. According to one example, a frequency f$_{AUX}$ of the auxiliary voltage V$_{AUX}$ is at least five times, at least ten times, at least twenty times or at least one hundred times the frequency of the main converter input voltage V22$_{IN}$. FIG. 27 further shows signal waveforms of an input current I$_{LLC}$ and an output current I3$_2$ of the resonant circuit (see, FIGS. 5A to 5C).

Referring to FIG. 27, a voltage V223 across the capacitor 223 of the resonant circuit is substantially sinusoidal in this example. An input current I$_{LLC}$ of the resonant circuit 22 is not exactly sinusoidal, which is by virtue of the fact that the input voltage V22$_{IN}$ of the resonant converter 22 is a rectangular voltage having the resonance frequency of the resonant converter which has superimposed the higher frequent PWM auxiliary voltage V$_{AUX}$. Equivalently, an output current I$_{32}$ of the resonant converter 22 is not exactly a sinusoidal current.

Figure 28:
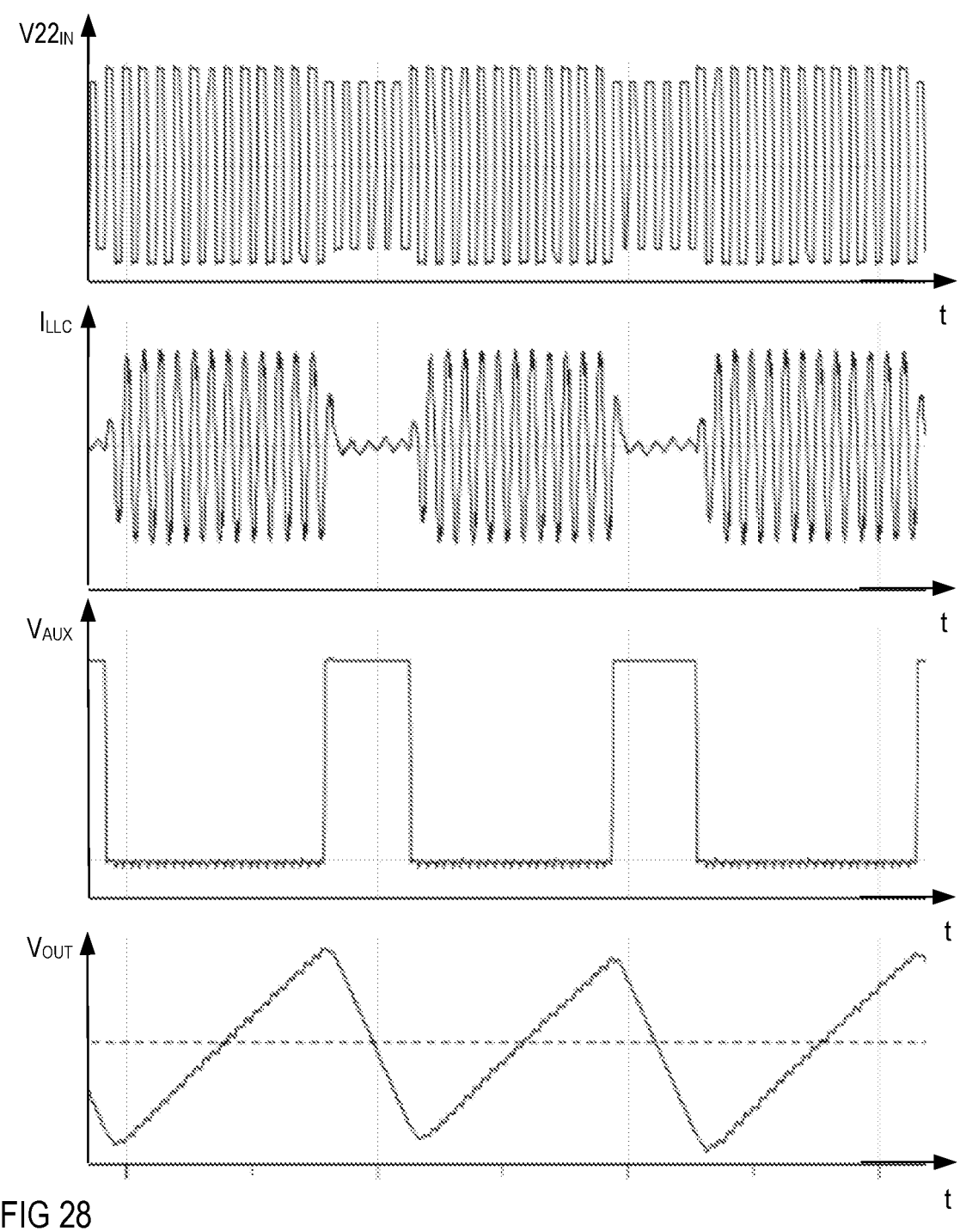
FIG. 28 are example timing diagrams illustrating signals occurring in the main converter shown in FIGS. 5A, 5B, 5C, and 5D when the auxiliary voltage is PWM voltage with a frequency lower than a frequency of an alternating voltage received by the resonant converter according to embodiments herein.

According to another example, the PWM auxiliary voltage V$_{AUX}$ is generated such that the frequency f$_{AUX}$ is lower than the resonant frequency and the frequency of the switching circuit output voltage V22$_{IN}$. The switching circuit output voltage V22$_{IN}$, in this example, resembles an amplitude modulated rectangular voltage. FIG. 28 shows one example of a switching circuit output voltage V22$_{IN}$ of this type. A waveform diagram of the corresponding auxiliary voltage V$_{AUX}$ is also shown in FIG. 28, at a different scale than the switching circuit output voltage V22$_{IN}$. According to one example, a frequency f$_{AUX}$ is less than 0.1 times, less than 0.05 times, or less than 0.01 times than the frequency f$_S$ of the switching circuit output voltage V22$_{IN}$ in this example.

In the example shown in FIG. 27, a signal level of the PWM auxiliary voltage V$_{AUX}$ changes several times in one period of the switching circuit output voltage V22$_{IN}$ so that resonant circuit 22 behaves similar than in an example in which the amplitude of the switching circuit output voltage V22$_{IN}$ is constant. Active power (real power) is received and transmitted by the resonant converter 22 in each period of the switching circuit output voltage V22$_{IN}$. This is different in the example shown in FIG. 28. In this example, real power is received by the resonant circuit 22 only in those time periods in which the switching circuit output voltage V22$_{IN}$ has the higher amplitude, that is, when the auxiliary voltage V$_{AUX}$ has its lower level, such as zero. In those time periods in which the switching circuit output voltage V22$_{IN}$ has the lower amplitude, that is, when the auxiliary voltage V$_{AUX}$ has its higher level, essentially only reactive power is received by the resonant circuit 22. Referring to FIG. 28, the output voltage is basically constant but includes a triangular voltage ripple when the switching circuit output voltage V22$_{IN}$ is generated as shown in FIG. 28.

Figure 29:
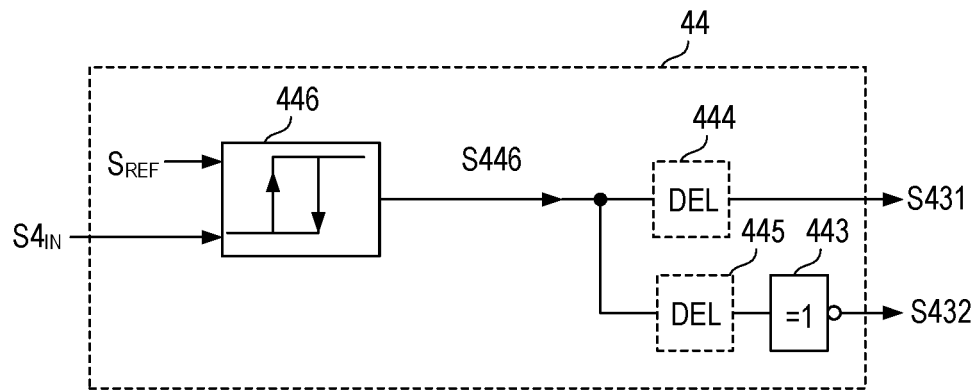
FIG. 29 is an example diagram illustrating a controller that may be used in an auxiliary voltage generator as shown in FIG. 25 and is suitable to generate an auxiliary voltage of the type shown in FIG. 28 according to embodiments herein.
Figure 30:
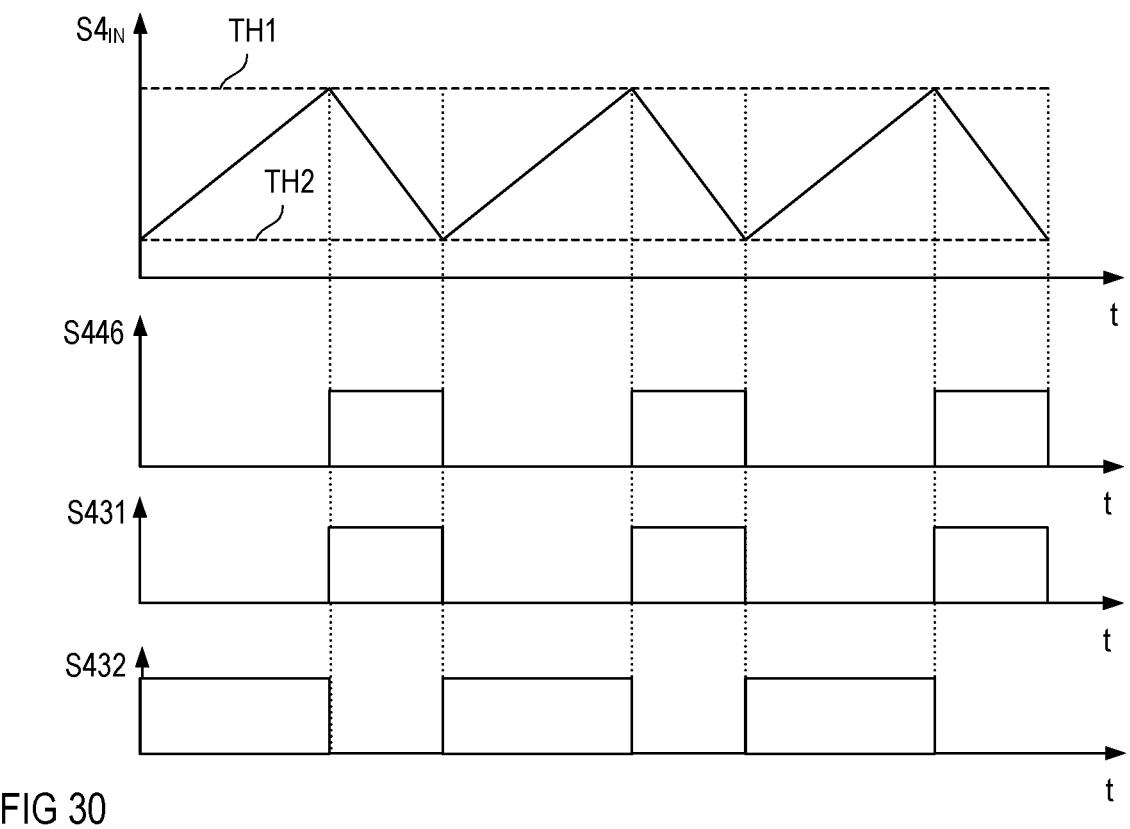
FIG. 30 is an example diagram illustrating timing of signals occurring in the controller shown in FIG. 29 according to embodiments herein.

An auxiliary voltage V$_{AUX}$ as shown in FIG. 28 can be obtained by using an auxiliary voltage generator 43 of the type shown in FIG. 25 having a controller 44 as shown in FIG. 29, for example. This controller 44 is a hysteresis controller that receives the signal S4$_{IN}$ which, for example, represents the output voltage V$_{OUT}$. A hysteresis circuit 446 of the controller 44 receives the input signal S4$_{IN}$ and generates a drive signal based on the input signal S4$_{IN}$ and a first threshold TH1 and a second threshold TH2, wherein the first threshold TH1 is higher than the second threshold TH2 in this example. Example signal diagrams of the input signal S4$_{IN}$ the first and second threshold TH1, TH2 and the drive signal S446 are shown in FIG. 30. According to this example, the hysteresis circuit may be configured to generate a first signal level of the drive signal S446 each time the input signal S4$_{IN}$ has reached the first threshold TH1 and until the input signal S4$_{IN}$ reaches the second threshold TH2 and a second signal level of the drive signal S446 each time the input signal S4$_{IN}$ has reached the second threshold TH2 and until the input signal S4$_{IN}$ reaches the first threshold TH1. The drive signals S431, S432 of the half-bridge 431, 432 (see FIG. 25) are generated based on the drive signal S446. FIG. 30 illustrates one example of how the half-bridge drive signals S431, S432 may be generated based on the drive signal S446 generated by the hysteresis circuit 446.

According to one example, the first signal level of the drive signal S446 is such that it switches on the high-side switch 431 and switches off the low-side switch 432 so that the auxiliary voltage $V_{AUX}$ equals the DC link voltage V42 when the drive signal S446 has the first level, that is, when the input signal $S4_{IN}$ decreases from the first threshold TH1 to the second threshold TH2. In this example, the auxiliary voltage $V_{AUX}$ is zero when the drive signal S446 has the second level, which switches off the high-side switch 431 and switches on the low-side switch 432, that is, when the input signal $S4_{IN}$ increases from the second threshold TH2 to the first threshold TH1.

When the auxiliary voltage $V_{AUX}$ is generated by an auxiliary voltage generator including a controller as explained with reference to FIG. 29, the triangular ripple of the output voltage $V_{OUT}$ is dependent on a voltage level of the DC link voltage V42 and the first and second threshold TH1, TH2.

Referring to the above, the first winding $3_1$ is inductively coupled with the second winding $3_2$ and the third winding $3_3$ can be inductively coupled with both the first winding $3_1$ and the second winding $3_2$. This can be obtained by forming the first winding $3_1$, the second winding $3_2$, and the third winding $3_3$ such that they are part of one transformer. According to another example, the first winding $3_1$ and the second winding $3_2$ are part of a first transformer and inductively coupled with each other, and the third winding $3_3$ is part of a second transformer that includes a further winding electrically coupled with one of the first winding $3_1$ and the second winding $3_2$. Different examples of this are explained with reference to FIGS. 31A to 31C and 33A to 33B. In each of these examples, reference character $3_4$ denotes the further winding of the second transformer.

In the examples shown in FIGS. 31A to 31C, the further winding $3_4$ is electrically coupled with the first winding $3_1$. In the example shown in FIG. 31A, the further winding $3_4$ is connected in series with the first winding $3_1$. Referring to FIG. $3_2$, the first transformer may include a first core $3_1$, wherein the first winding $3_1$ and the second winding $3_2$ are wound around this first core $3_1$, and the second transformer may include a second core $3_2$, wherein the third winding $3_3$ and the further winding $3_4$ are wound around this second core $3_2$. In the example shown in FIG. 31B, the further winding $3_4$ is connected in parallel with the first winding $3_1$; and in the example shown in FIG. 31C, the further winding $3_4$ is connected between a tap of the first winding $3_1$ and one terminal of the first winding $3_1$.

In the examples shown in FIGS. 33A and 33B, the further winding $3_4$ is electrically coupled with the second winding $3_2$. In the example shown in FIG. 33A, the further winding $3_4$ is connected in parallel with the second winding $3_2$; and in the example shown in FIG. 33B, the further winding $3_4$ is connected between a tap of the second winding $3_2$ and one terminal of the second winding $3_2$. In each of the examples explained with reference to FIGS. 31A to 31C and 33A to 33B, the third winding is indirectly inductively coupled with one of the first winding $3_1$ and the second winding $3_2$ in that it is directly inductively coupled with the further winding $3_4$ which is electrically coupled with the one of the first winding $3_1$ and the second winding $3_2$.

The invention claimed is:

1. A power converter circuit comprising:
a power converter input node operative to receive an input voltage;
a power converter output node operative to produce an output voltage, the power converter output node having an upper terminal and a lower terminal;
a main converter comprising a first winding inductively coupled to a second winding, the main converter further comprising a main converter output node, the main converter output node having an upper terminal and a lower terminal;
an auxiliary converter, the auxiliary converter including a third winding inductively coupled to the second winding and the first winding, a combination of the main converter and the auxiliary converter being coupled between the power converter input node and the power converter output node, the auxiliary converter operative to produce an auxiliary converter differential output, the auxiliary converter differential output being coupled between the upper terminal of the main converter output node of the main converter and the upper terminal of the power converter output node; and
wherein the auxiliary converter includes a buck converter comprising a first switch, a second switch, and an inductor.

2. The power converter as in claim 1, wherein the auxiliary converter is a voltage converter operative to convert a voltage signal produced by the third winding into an auxiliary converter differential output voltage outputted from the auxiliary converter differential output.

3. The power converter circuit as in claim 2, wherein a magnitude of the output voltage at the power converter output node is a summation of a main converter output voltage outputted from the main converter output node and the auxiliary converter differential output voltage.

4. The power converter circuit as in claim 1, wherein the auxiliary converter includes a rectifier operative to rectify a voltage received from the third winding.

5. The power converter circuit as in claim 4, wherein the auxiliary converter is operative to convert the rectified voltage into an auxiliary differential voltage outputted from the auxiliary converter differential output.

6. The power converter circuit as in claim 1, wherein the auxiliary converter differential output is connected in series between the main converter and the power converter output node.

7. A method comprising:
at a power converter input node of a power converter circuit, receiving an input voltage from a power source, the input voltage received to generate an output voltage from the power converter circuit via a combination of a main converter and an auxiliary converter in the power converter circuit, the main converter including a first winding inductively coupled to a second winding to produce a main converter output voltage at a main converter output node, the auxiliary converter including a third winding inductively coupled to the second winding and the first winding, the main converter output node having an upper terminal and a lower terminal, the power converter circuit further comprising a power converter output node having an upper terminal and a lower terminal;
via the auxiliary converter, generating an auxiliary converter differential output, the auxiliary converter including a buck converter comprising a first switch, a second switch, and an inductor;
wherein the auxiliary converter differential output is coupled between the upper terminal of the main converter output node and the upper terminal of the power converter output node; and
producing a power converter output voltage outputted from the power converter circuit based on a combination of the main converter output voltage produced by the main converter and an auxiliary converter differential output voltage outputted from the auxiliary converter differential output.

8. The method as in claim 7 further comprising:

via the auxiliary converter, converting a voltage signal produced by the third winding into the auxiliary converter differential output voltage.

9. The method as in claim 7, wherein a magnitude of the power converter output voltage is a summation of the main converter output voltage outputted from the main converter and the auxiliary converter differential output voltage.

10. The method as in claim 7 further comprising:

via the auxiliary converter, rectifying a voltage received from the third winding.

11. The method as in claim 10 further comprising:

via the buck converter, converting the rectified voltage into the auxiliary converter differential output voltage outputted from the auxiliary converter differential output.

* * * * *